United States Patent
Nakamura et al.

(10) Patent No.: US 11,936,306 B2
(45) Date of Patent: Mar. 19, 2024

(54) POWER CONVERSION DEVICE

(71) Applicant: Mitsubishi Electric Corporation, Tokyo (JP)

(72) Inventors: Fuminori Nakamura, Tokyo (JP); Takeshi Kikuchi, Tokyo (JP); Daisuke Yamanaka, Tokyo (JP); Takuya Kajiyama, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 227 days.

(21) Appl. No.: 17/635,415

(22) PCT Filed: Sep. 9, 2019

(86) PCT No.: PCT/JP2019/035411
§ 371 (c)(1),
(2) Date: Feb. 15, 2022

(87) PCT Pub. No.: WO2021/048906
PCT Pub. Date: Mar. 18, 2021

(65) Prior Publication Data
US 2022/0337173 A1    Oct. 20, 2022

(51) Int. Cl.
*H02M 7/49* (2007.01)
*H02M 1/00* (2006.01)
(Continued)

(52) U.S. Cl.
CPC ........... *H02M 7/49* (2013.01); *H02M 1/0025* (2021.05); *H02M 7/5395* (2013.01);
(Continued)

(58) Field of Classification Search
CPC .... H02M 1/0025; H02M 1/0085; H02M 7/49; H02M 7/797; H02M 7/4833; H02M 7/4835; H02M 7/5395
See application file for complete search history.

(56) References Cited

U.S. PATENT DOCUMENTS

| 2010/0118578 A1 | 5/2010 | Dommaschk et al. |
| 2021/0058007 A1 | 2/2021 | Hario et al. |
| 2022/0014114 A1 | 1/2022 | Kajiyama et al. |

FOREIGN PATENT DOCUMENTS

| CN | 104795980 A | 7/2015 |
| CN | 107342623 A | 11/2017 |

(Continued)

OTHER PUBLICATIONS

Extended European Search Report dated Aug. 4, 2022, issued in corresponding European Patent Application No. 19944985.1, 8 pages.

(Continued)

*Primary Examiner* — Thienvu V Tran
*Assistant Examiner* — Johana Dumeng-Roman
(74) *Attorney, Agent, or Firm* — BUCHANAN INGERSOLL & ROONEY PC

(57) ABSTRACT

In an MMC-based power conversion device, a control device generates, for each leg circuit, a first voltage command value not based on circulating current circulating between a plurality of leg circuits and a second voltage command value based on the circulating current. A plurality of individual controllers are provided respectively corresponding to a plurality of converter cells and generate a gate control signal for controlling turning on and off of a switching element of the corresponding converter cell, based on the first voltage command value and the second voltage command value. When generating the gate control signal using pulse width modulation, each individual controller modulates a carrier signal in accordance with the second voltage command value such that the pulse width of the gate control signal changes in accordance with the second voltage command value.

12 Claims, 15 Drawing Sheets

(51) Int. Cl.
*H02M 7/5395* (2006.01)
*H02M 7/797* (2006.01)
*H02M 7/483* (2007.01)

(52) U.S. Cl.
CPC .......... *H02M 7/797* (2013.01); *H02M 1/0085* (2021.05); *H02M 7/4833* (2021.05)

(56) References Cited

FOREIGN PATENT DOCUMENTS

| | | |
|---|---|---|
| CN | 109995085 A | 7/2019 |
| JP | H06153519 A | 5/1994 |
| JP | H08322266 A | 12/1996 |
| JP | 2010148219 A | 7/2010 |
| JP | 2011155788 A | 8/2011 |
| JP | 2013042591 A | 2/2013 |
| JP | 5189105 B2 | 4/2013 |
| JP | 2013255350 A | 12/2013 |
| JP | 5721096 B2 | 5/2015 |
| JP | 6377310 B1 | 8/2018 |
| JP | 6559387 B1 | 8/2019 |
| WO | WO-2019073761 A1 * 4/2019 .............. H02M 7/48 |

OTHER PUBLICATIONS

International Search Report (PCT/ISA/210) with English translation and Written Opinion (PCT/ISA/237) dated Dec. 3, 2019, by the Japan Patent Office as the International Searching Authority for International Application No. PCT/JP2019/035411.

* cited by examiner

FIG. 9
(A) 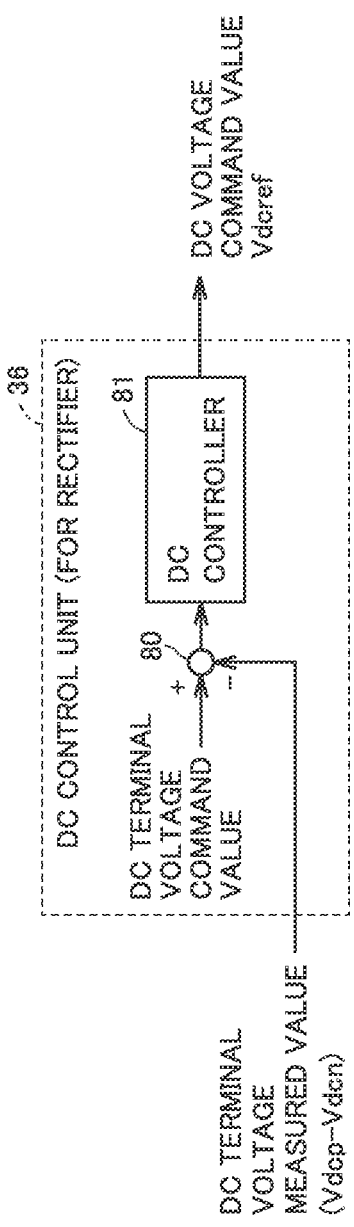
(B) 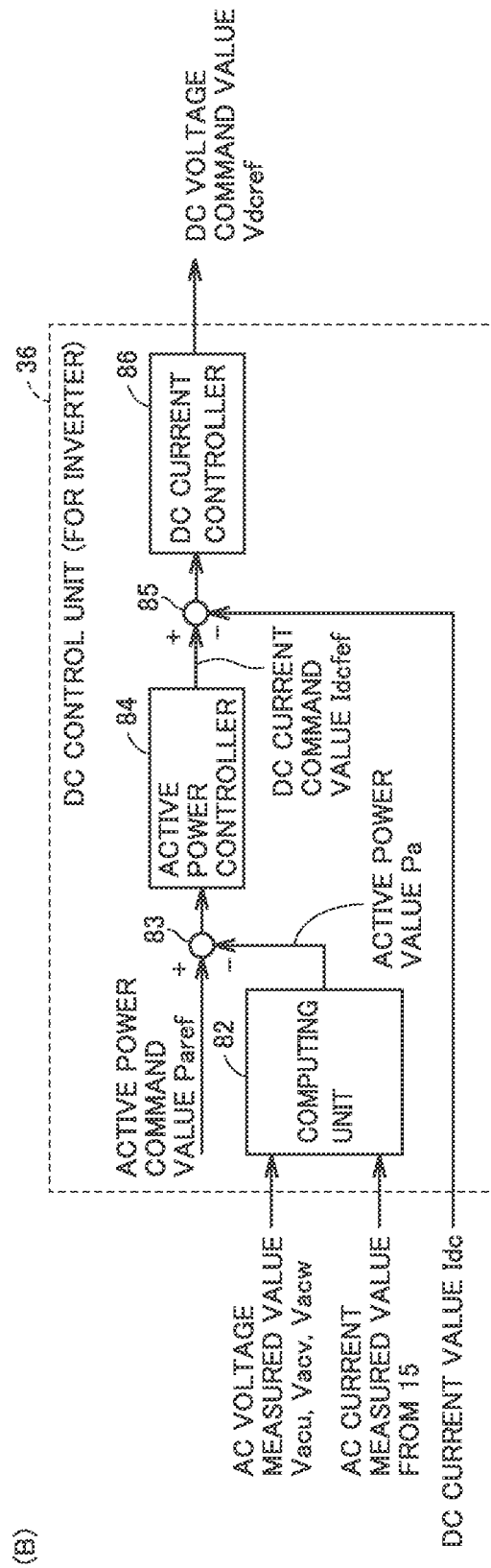

FIG.12
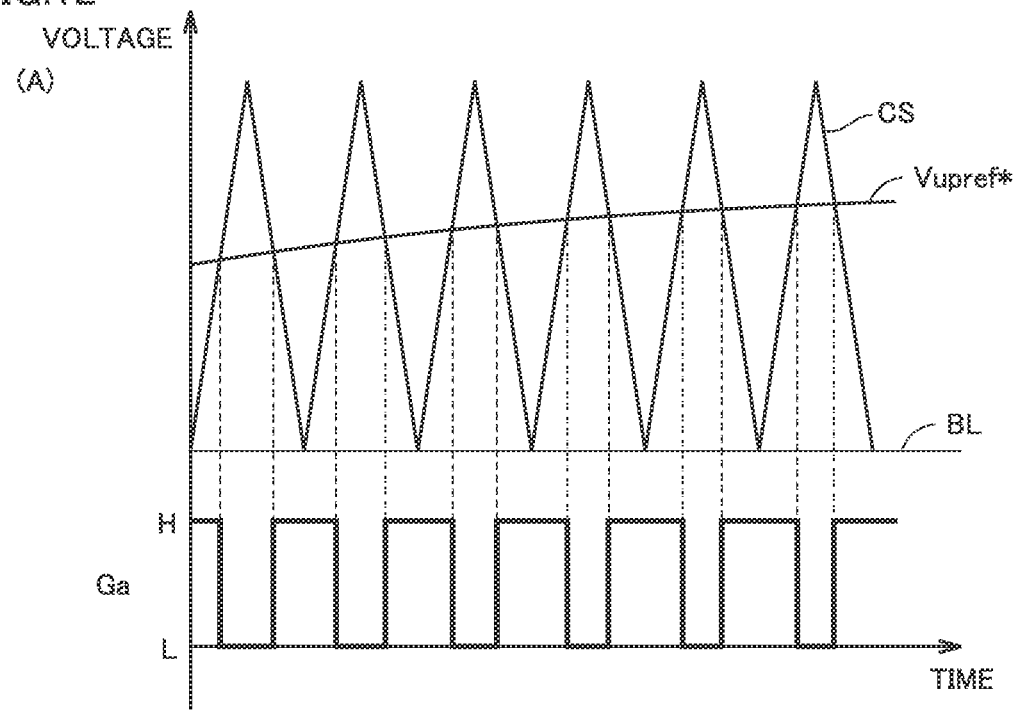
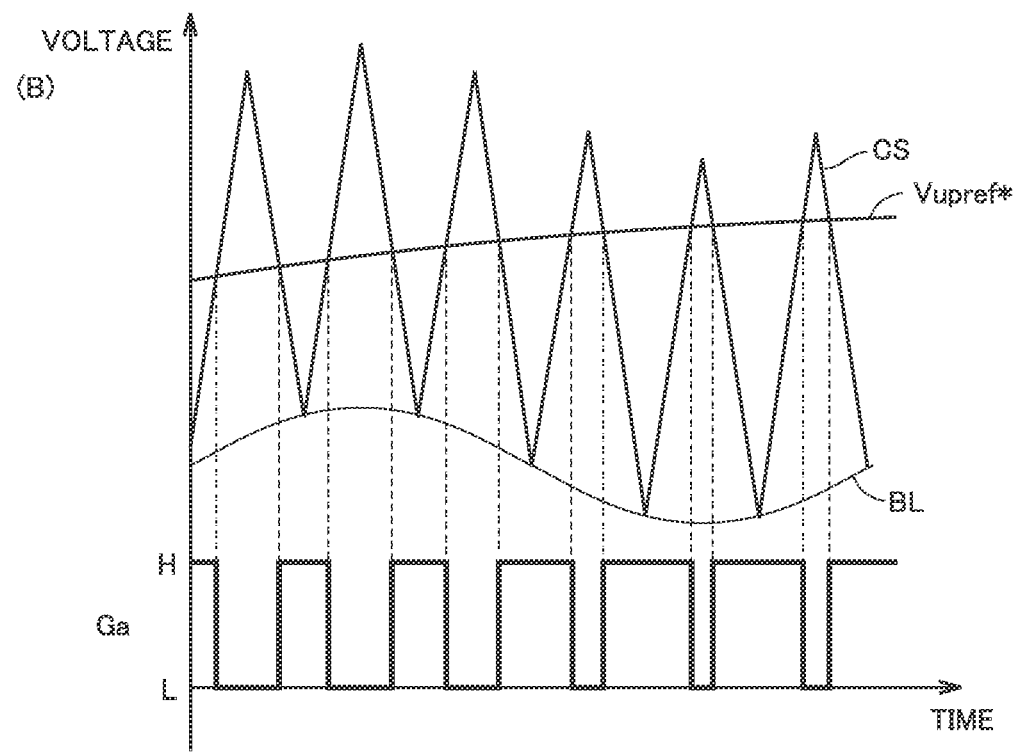

POWER CONVERSION DEVICE

TECHNICAL FIELD

The present disclosure relates to a power conversion device for use in high-voltage DC power transmission, frequency converters, static var compensators, and the like.

BACKGROUND ART

Modular multilevel converters (MMC) are known as large-capacity power conversion devices installed in power systems.

In a modular multilevel converter, circulating current that circulates between a plurality of legs without flowing to the outside may flow, and this circulating current need to be regulated to zero or a certain value. As a conventional technique for controlling circulating current, for example, a method disclosed in Japanese Patent No. 5189105 (PTL 1) is known.

In the power conversion device disclosed in PTL 1, "the regulation predetermines desired circulating voltage setpoint values, which are applied during the regulation of the associated phase module branch as the setpoint value, for example other setpoint voltages of the phase module branch affected".

CITATION LIST

Patent Literature

PTL 1: Japanese Patent No. 5189105

SUMMARY OF INVENTION

Technical Problem

The magnitude of a target value of circulating voltage is usually much smaller than the magnitude of a voltage target value of each phase. Therefore, if a final control signal is generated by adding a circulating voltage target value to a voltage target value of each phase as disclosed in PTL 1, the controllability of circulating current becomes worse. This is because the dynamic range of a control signal is limited by hardware and the quantization bit rate corresponding to the circulating voltage target value decreases.

The present disclosure is made in view of the problem above. An object of the present disclosure is to provide an MMC-based power conversion device that can control circulating current accurately. Other objects and features of the present disclosure will be explained in the embodiments.

Solution to Problem

A power conversion device according to an embodiment includes a plurality of leg circuits. Each of the leg circuits includes a plurality of converter cells cascaded to each other. Each of the converter cells includes an energy storage and a switching element. The power conversion device further includes a control device and a plurality of individual controllers. The control device generates, for each of the leg circuits, a first voltage command value not based on circulating current circulating between the leg circuits and a second voltage command value based on the circulating current. The individual controllers are provided respectively corresponding to the converter cells and generate a gate control signal to control turning on and off of the switching element of the corresponding converter cell, based on the first voltage command value and the second voltage command value. Each of the individual controllers includes a comparator to generate the gate control signal using pulse width modulation by comparison between the first voltage command value and a carrier signal, and a carrier generator to generate the carrier signal modulated by the second voltage command value such that a pulse width of the gate control signal changes in accordance with the second voltage command value.

Advantageous Effects of Invention

The power conversion device according to the foregoing embodiment can control circulating current accurately by modulating the carrier signal by the second voltage command value based on circulating current.

BRIEF DESCRIPTION OF DRAWINGS

FIG. 9 is a diagram for explaining the operation of a DC control unit in the all-arm common controller in FIG. 6.

FIG. 12 is a diagram for explaining a first modulation method of a carrier signal.

DESCRIPTION OF EMBODIMENTS

Embodiments of the present invention will be described in detail below with reference to the drawings. Like or corresponding parts are denoted by like reference signs and a description thereof will not be repeated.

First Embodiment

[Overall Configuration of Power Conversion Device]

Figure 1:
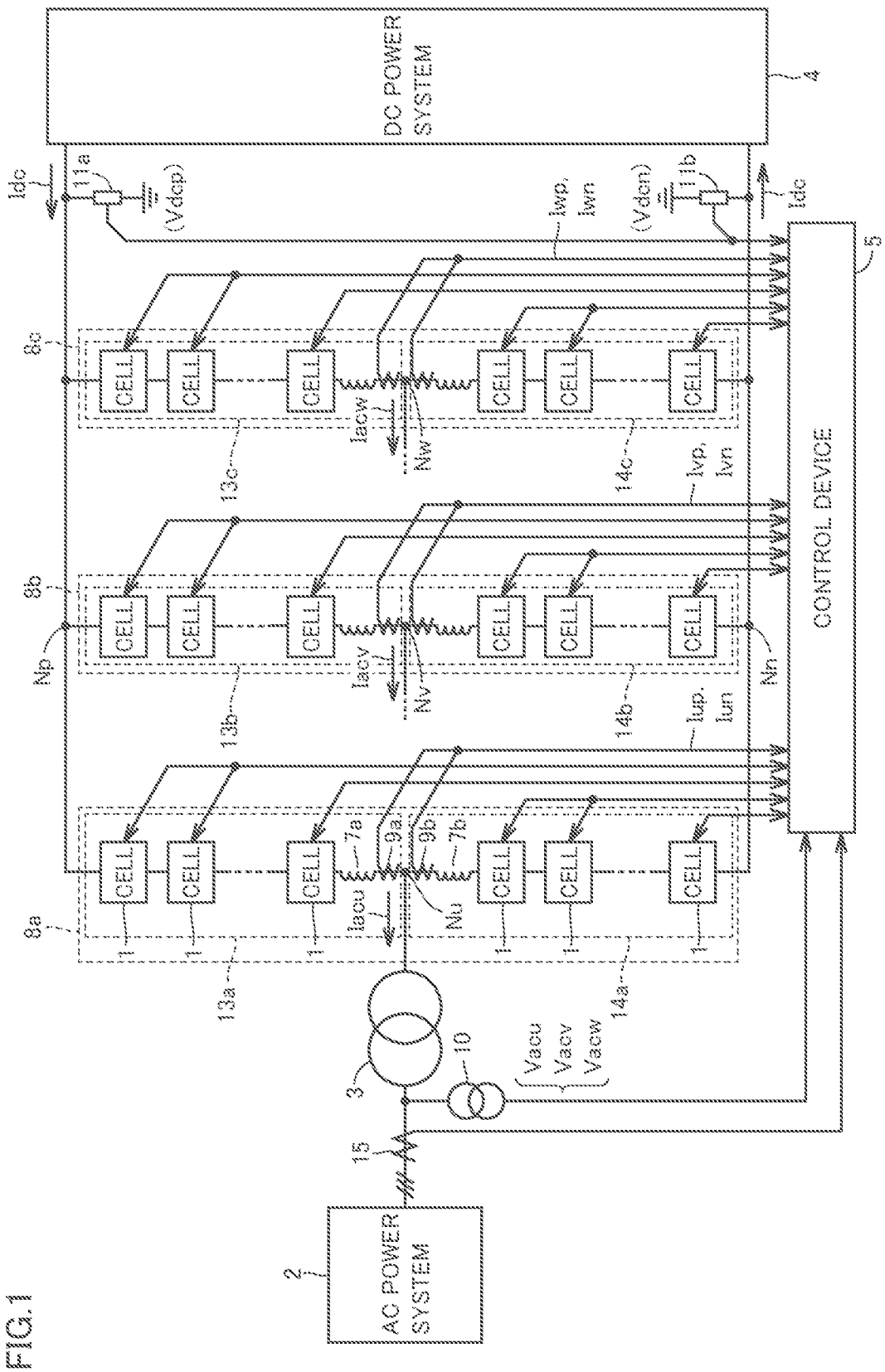
FIG. 1 is a schematic configuration diagram of a power conversion device according to a first embodiment.

FIG. 1 is a schematic configuration diagram of a power conversion device according to a first embodiment. The power conversion device in FIG. 1 is, for example, a power conversion device for use for high-voltage DC power transmission or a power conversion device for forward conversion or reverse conversion in a frequency converter.

Referring to FIG. 1, the power conversion device includes leg circuits 8a, 8b, and 8c as main circuits and a control device 5 to control these leg circuits 8. Hereinafter, leg circuits 8a, 8b, and 8c are denoted as leg circuit 8 when they are collectively referred to or an unspecified one of them is referred to.

Leg circuit 8 is provided for each phase of multi-phase alternating current and connected between an AC circuit 2 and a DC circuit 4 to perform power conversion between those circuits. In FIG. 1, AC circuit 2 is for three-phase alternating current, and three leg circuits 8a, 8b, and 8c are provided respectively corresponding to u phase, v phase, and w phase. For single-phase alternating current, two leg circuits are provided.

AC terminals Nu, Nv, and Nw respectively provided for leg circuits 8a, 8b, and 8c are connected to AC circuit 2 through an interconnecting transformer 3. AC circuit 2 is, for example, an AC power system including an AC power source. In FIG. 1, for simplification of illustration, the connection between AC terminals Nv and Nw and interconnecting transformer 3 is not shown. DC terminals Np and Nn (that is, positive-side DC terminal Np, negative-side DC terminal Nn) provided common to leg circuits 8 are connected to DC circuit 4. DC circuit 4 is, for example, a DC power system including a DC power transmission grid and another power conversion device that outputs direct current.

Instead of using interconnecting transformer 3 in FIG. 1, leg circuits 8a, 8b, and 8c may be connected to AC circuit 2 through an interconnecting reactor. Furthermore, instead of AC terminals Nu, Nv, and Nw, leg circuits 8a, 8b, and 8c may be provided with respective primary windings, and leg circuits 8a, 8b, and 8c may be AC connected to interconnecting transformer 3 or the interconnecting reactor through secondary windings magnetically coupled to the primary windings. In this case, the primary windings may be the following reactors 7a and 7b. Specifically, leg circuits 8 are electrically (that is, DC or AC) connected to AC circuit 2 through connections provided for leg circuits 8a, 8b, and 8c, such as AC terminals Nu, Nv, and Nw or the primary windings.

Leg circuit 8a is divided into a positive-side arm 13a from positive-side DC terminal Np to AC input terminal Nu and a negative-side arm 14a from negative-side DC terminal Nn to AC input terminal Nu. Positive-side arm 13a may be called upper arm or primary arm, and negative-side arm 14a may be called lower arm or secondary arm. The connection point between positive-side arm 13a and negative-side arm 14a is u-phase AC terminal Nu connected to a transformer 3. Positive-side DC terminal Np and negative-side DC terminal Nn are connected to DC circuit 4.

Similarly, leg circuit 8b includes a positive-side arm 13b and a negative-side arm 14b, and leg circuit 8c includes a positive-side arm 13c and a negative-side arm 14c. Leg circuits 8b and 8c have a configuration similar to that of leg circuit 8a, and hereinafter leg circuit 8a is explained as a representative.

In leg circuit 8a, positive-side arm 13a includes a plurality of cascaded converter cells 1 and a reactor 7a. Converter cells 1 and reactor 7a are connected in series with each other. Hereinafter, for the sake of simplicity, the converter cells may be referred to as cells. Converter cells 1 may be referred to as submodules (SM). Similarly, negative-side arm 14 includes a plurality of cascaded converter cells 1 and a reactor 7b. Converter cells 1 and reactor 7b are connected in series with each other.

Reactor 7a may be inserted at any position in positive-side arm 13 of leg circuit 8a, and reactor 7b may be inserted at any position in negative-side arm 14 of leg circuit 8a. A plurality of reactors 7a and a plurality of reactors 7b may be provided. The inductances of the reactors may be different from each other. Only reactor 7a of positive-side arm 13 or only reactor 7b of negative-side arm 14 may be provided.

The power conversion device in FIG. 1 further includes an AC voltage detector 10, an AC current detector 15, DC voltage detectors 11a and 11b, and arm current detectors 9a and 9b provided for each leg circuit 8. These detectors measure the quantity of electricity (that is, current, voltage) for use in control of the power conversion device. Signals detected by these detectors are input to control device 5.

Specifically, AC voltage detector 10 detects a u-phase voltage value Vacu, a v-phase voltage value Vacv, and a w-phase voltage value Vacw of AC circuit 2. AC current detector 15 is provided for each of u phase, v phase, and w phase of AC circuit 2 and detects an AC current value of the corresponding phase. DC voltage detector 11a detects a voltage at positive-side DC terminal Np connected to DC circuit 4. DC voltage detector 11b detects a voltage at negative-side DC terminal Nn connected to DC circuit 4. Arm current detectors 9a and 9b provided in leg circuit 8a for u phase respectively detect arm current Iup flowing through positive-side arm 13a and arm current Iun flowing through negative-side arm 14a. Similarly, arm current detectors 9a and 9b provided in leg circuit 8b for v phase respectively detect positive-side arm current Ivp and negative-side arm current Ivn. Arm current detectors 9a and 9b provided for leg circuit 8c for w phase respectively detect positive-side arm current Iwp and negative-side arm current Iwn. Here, in arm currents Iup, Iun, Ivp, Ivn, Iwp, and Iwn, current flowing in the direction from positive-side DC terminal Np to negative-side DC terminal Nn is positive.

[Configuration of Converter Cell]

Figure 2:
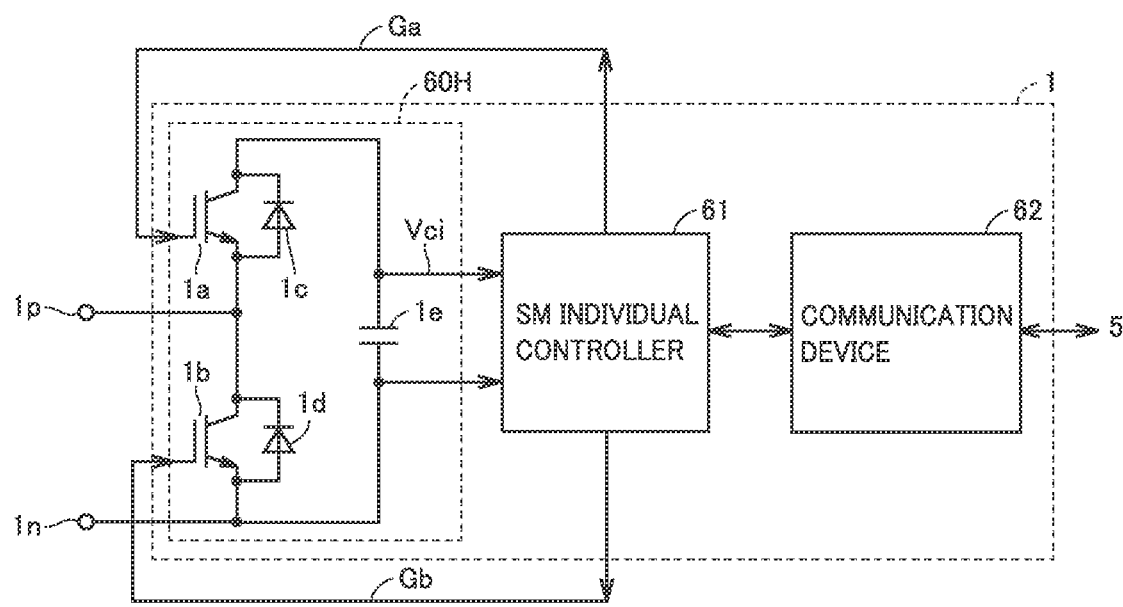
FIG. 2 is a block diagram showing a configuration example of a converter cell in FIG. 1.

FIG. 2 is a block diagram showing a configuration example of a converter cell in FIG. 1. Referring to FIG. 2, converter cell 1 as an example includes a main circuit 60H, an individual controller 61 for converter cell, and a communication device 62. The main circuit of the converter cell may be referred to as submodule main circuit. Individual controller 61 for converter cell may be referred to as submodule individual controller 61.

In FIG. 2, the configuration of half bridge-type main circuit 60H is shown as main circuit 60H. As described later with reference to FIG. 3, a bridge circuit of a different configuration may be used instead of main circuit 60H.

As shown in FIG. 2, half bridge-type main circuit 60H includes semiconductor switching elements 1a and 1b connected in series, diodes 1c and 1d, and a DC capacitor 1e serving as an energy storage. The semiconductor switching elements may be simply referred to as switching elements. Diodes 1c and 1d are connected in antiparallel (in parallel and in reverse bias direction) with switching elements 1a and 1b, respectively. DC capacitor 1e is connected in parallel with the series connection circuit of switching elements 1a and 1b and smooths a DC voltage. The connection node of switching elements 1a and 1b is connected to positive-side input/output terminal 1p, and the connection node of switching element 1b and DC capacitor 1e is connected to negative-side input/output terminal 1n.

In main circuit 60H, switching elements 1a and 1b are controlled such that one of them is turned on and the other is turned off. When switching element 1a is turned on and switching element 1b is turned off, the voltage between both ends of DC capacitor 1e is applied between input/output terminals 1p and 1n. In this case, input/output terminal 1p has a positive-side voltage, and input/output terminal 1n has a negative-side voltage. On the other hand, when switching element 1a is turned off and switching element 1b is turned on, the voltage between input/output terminals 1p and 1n is 0 V.

In other words, in main circuit 60H shown in FIG. 2, switching elements 1a and 1b are alternately turned on, whereby zero voltage or positive voltage can be output. The magnitude of positive voltage is dependent on the voltage at DC capacitor 1e. Diodes 1c and 1d are provided for protection for when a reverse-direction voltage is applied to switching elements 1a and 1b.

Individual controller 61 controls the on and off of switching elements 1a and 1b provided in main circuit 60H, based on an arm voltage command value and a circulating voltage command value received from control device 5 in FIG. 1. Specifically, individual controller 61 outputs gate control signals Ga and Gb to the control electrodes of switching elements 1a and 1b, respectively.

Furthermore, individual controller 61 detects a voltage value of DC capacitor 1e and performs analog-to-digital (A/D) conversion of the detected voltage value. Individual controller 61 uses the detected capacitor voltage measured value Vci for voltage control of DC capacitor 1e. Furthermore, submodule individual controller 61 transmits the detected capacitor voltage measured value Vci to control device 5 through communication device 62.

Communication device 62 communicates with a communication circuit (52 in FIG. 10) provided in control device 5 in FIG. 1 to receive an arm voltage command value and a circulating voltage command value from control device 5. Furthermore, communication device 62 transmits the capacitor voltage measured value Vci after A/D conversion detected by individual controller 61 to control device 5. The form of communication between communication device 62 and control device 5 is preferably optical communication in view of noise immunity.

[Modification of Main Circuit of Converter Cell]

Figure 3:
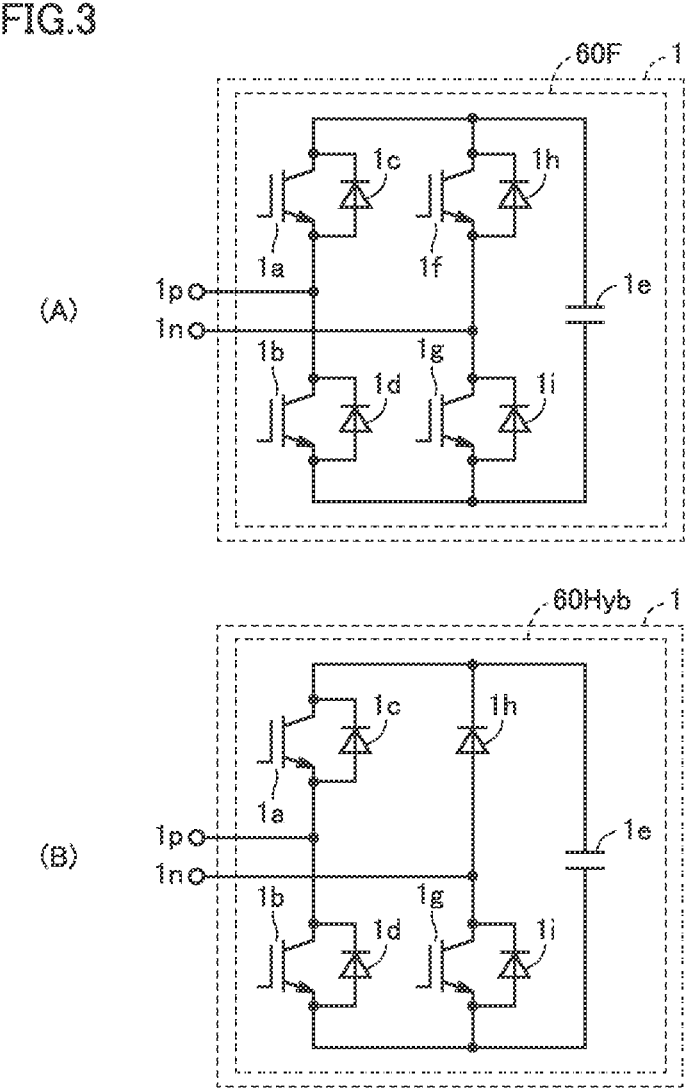
FIG. 3 is a circuit diagram showing a modification to a main circuit of the converter cell in FIG. 2.

FIG. 3 is a circuit diagram showing a modification to the main circuit of the converter cell in FIG. 2. Converter cell 1 shown in FIG. 3(A) includes a full bridge-type main circuit 60F. Main circuit 60F differs from main circuit 60H in FIG. 3(A) in that it further includes switching elements 1f and 1g connected in series and diodes 1h and 1i connected in antiparallel with switching elements 1f and 1g, respectively. The whole of switching elements 1f and 1g is connected in parallel with the series connection circuit of switching elements 1a and 1b and is connected in parallel with DC capacitor 1e. Input/output terminal 1p is connected to the connection node of switching elements 1a and 1b, and input/output terminal 1n is connected to the connection node of switching elements 1f and 1g.

In normal operation, main circuit 60F shown in FIG. 3(A) is controlled such that switching element 1g is always turned on, switching element 1f is always turned off, and switching elements 1a and 1b are alternately turned on. Thus, main circuit 60F can output zero voltage or positive voltage between input/output terminals 1p and 1n.

On the other hand, main circuit 60F shown in FIG. 3(A) can output zero voltage or negative voltage between input/output terminals 1p and 1n under control different from that of normal operation. Specifically, switching element 1g is turned off, switching element 1f is turned on, and switching elements 1a and 1b are alternately turned on, whereby zero voltage or negative voltage can be output.

Converter cell 1 shown in FIG. 3(B) includes a hybrid-type main circuit 60Hyb. Main circuit 60Hyb has a configuration in which switching element 1f is eliminated from main circuit 60F in FIG. 3(A), and the other configuration of main circuit 60Hyb is the same as in FIG. 3(A).

In normal operation, main circuit 60Hyb in FIG. 3(B) is controlled such that switching element 1g is always turned on and switching elements 1a and 1b are alternately turned on. Thus, main circuit 60Hyb can output zero voltage or positive voltage between input/output terminals 1p and 1n. On the other hand, main circuit 60Hyb can output negative voltage when switching elements 1a and 1g are turned off, switching element 1b is turned on, and current flows in the direction from input/output terminal 1n to input/output terminal 1p.

Turn-off switching elements capable of controlling both the on operation and the off operation are used for switching elements 1a, 1b, 1f, and 1g shown in FIG. 2, FIG. 3(A), and FIG. 3(B). For example, insulated gate bipolar transistors (IGBTs) or gate commutated turn-off thyristors (GCTs) can be used as switching elements 1a, 1b, 1f, and 1g.

Hereinafter, main circuits 60H, 60H, and 60Hyb may be collectively denoted as main circuit 60. Main circuit 60 included in converter cell 1 may have a configuration other than those shown in FIG. 2, FIG. 3(A), and FIG. 3(B).

[Overall Configuration of Control Device]

Figure 4:
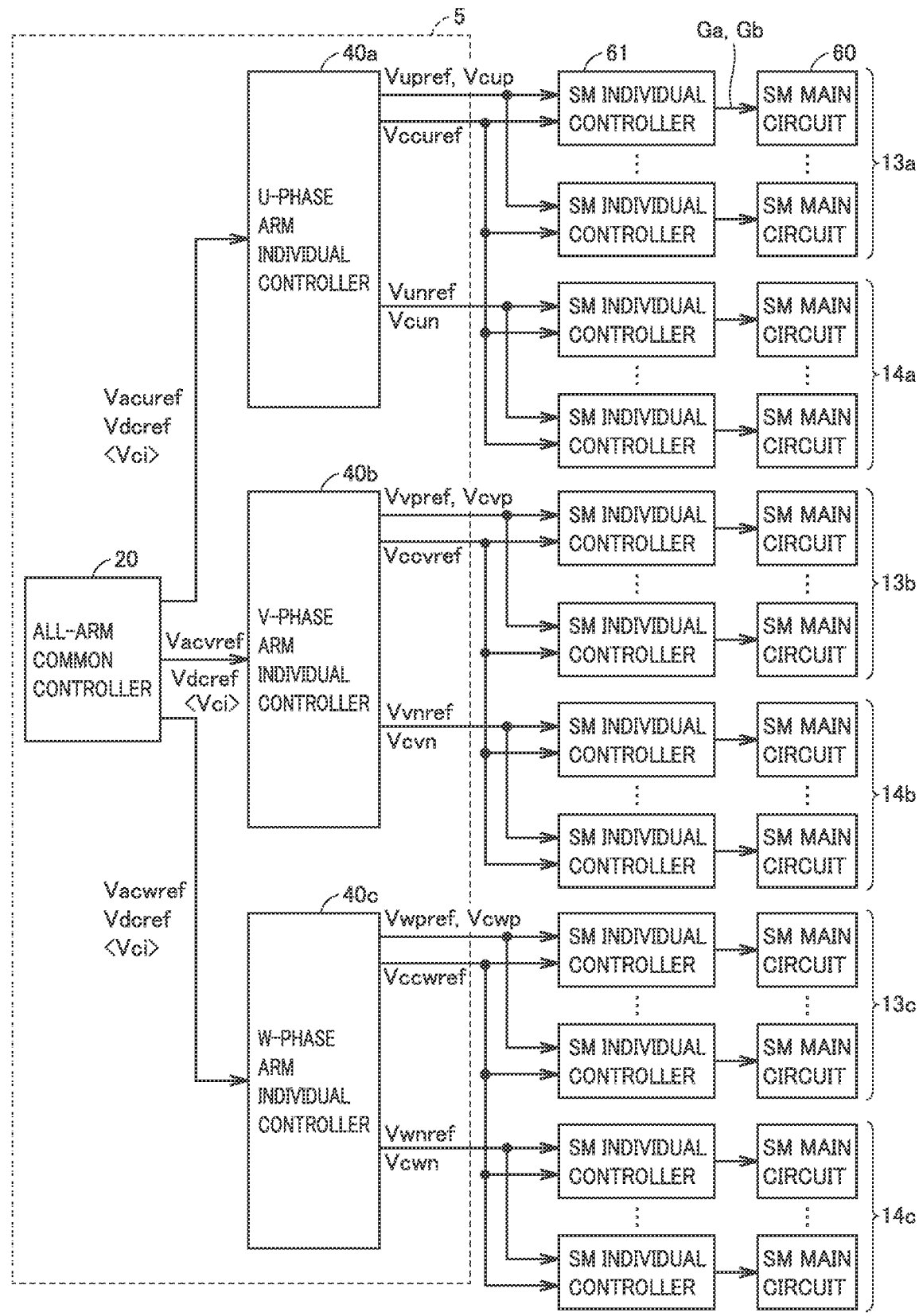
FIG. 4 is a block diagram showing an overall configuration of a control device in FIG. 1.

FIG. 4 is a block diagram showing an overall configuration of the control device in FIG. 1. FIG. 4 also shows main circuit 60 and individual controller 61 provided in each converter cell 1. For simplification of illustration, communication device 62 is not illustrated in the drawing.

Referring to FIG. 4, control device 5 includes an all-arm common controller 20, a u-phase arm individual controller 40a, a v-phase arm individual controller 40b, and a w-phase arm individual controller 40c.

All-arm common controller 20 generates AC voltage command value Vacuref, Vacvref, Vacwref of each phase, based on the arm current measured value and the AC voltage measured value. Furthermore, all-arm common controller 20 outputs a DC voltage command value Vdcref. Furthermore, all-arm common controller 20 generates a capacitor voltage mean value <Vci> from the capacitor voltage measured values of converter cells 1. As explained with reference to FIG. 7, the capacitor voltage mean value <Vci> is calculated for each of various units.

U-phase arm individual controller 40a generates a u-phase arm voltage command value, based on u-phase AC voltage command value Vacuref and DC voltage command value Vdcref received from all-arm common controller 20. Here, the u-phase arm voltage command value includes a u-phase positive-side arm voltage command value Vupref to be output to u-phase positive-side arm 13a and a u-phase negative-side arm voltage command value Vunref to be output to u-phase negative-side arm 14a.

U-phase arm individual controller 40a further generates a u-phase circulating voltage command value Vccuref, based on the capacitor voltage mean value <Vci> received from all-arm common controller 20 and a u-phase circulating current value at the present time. The u-phase circulating voltage command value Vccuref is a voltage command value to be output in common to the converter cells 1 of u-phase positive-side arm 13a and u-phase negative-side arm 14a in order to control u-phase circulating current.

U-phase arm individual controller 40a further outputs a u-phase positive-side capacitor voltage mean value Vcup to each individual controller 61 of u-phase positive-side arm 13a. U-phase arm individual controller 40a also outputs a u-phase negative-side capacitor voltage mean value Vcun to each individual controller 61 of u-phase negative-side arm 14a.

Similarly, v-phase arm individual controller 40b generates a v-phase arm voltage command value, based on a v-phase AC voltage command value Vacvref and a DC voltage command value Vdcref. The V-phase arm voltage command value includes a v-phase positive-side arm voltage command value Vvpref to be output to v-phase positive-side arm 13b and a v-phase negative-side arm voltage command value Vvnref to be output to v-phase negative-side arm 14b. V-phase arm individual controller 40b further generates a v-phase circulating voltage command value Vccvref, based on the capacitor voltage mean value <Vci> received from all-arm common controller 20 and a v-phase circulating current value at the present time. The v-phase circulating voltage command value Vccvref is a voltage command value to be output in common to the converter cells 1 of v-phase positive-side arm 13b and v-phase negative-side arm 14b in order to control v-phase circulating current. V-phase arm individual controller 40b further outputs a v-phase positive-side capacitor voltage mean value Vcvp to each individual controller 61 of v-phase positive-side arm 13b. V-phase arm individual controller 40b also outputs a v-phase negative-side capacitor voltage mean value Vcvn to each individual controller 61 of v-phase negative-side arm 14b.

Similarly, w-phase arm individual controller 40c generates a w-phase arm voltage command value, based on a w-phase AC voltage command value Vacwref and a DC voltage command value Vdcref. W-phase arm voltage command value includes a w-phase positive-side arm voltage command value Vwpref to be output to w-phase positive-side arm 13c and a w-phase negative-side arm voltage command value Vwnref to be output to w-phase negative-side arm 14c. W-phase arm individual controller 40c further generates a w-phase circulating voltage command value Vccwref, based on the capacitor voltage mean value <Vci> received from all-arm common controller 20 and a w-phase circulating current value at the present time. The w-phase circulating voltage command value Vccwref is a voltage command value to be output in common to the converter cells 1 of w-phase positive-side arm 13c and w-phase negative-side arm 14c in order to control w-phase circulating current. W-phase arm individual controller 40c further outputs a w-phase positive-side capacitor voltage mean value Vcwp to each individual controller 61 of w-phase positive-side arm 13c. W-phase arm individual controller 40c also outputs a w-phase negative-side capacitor voltage mean value Vcwn to each individual controller 61 of w-phase negative-side arm 14c.

Arm individual controller 40a, 40b, 40c of each phase transmits the arm voltage command value, the circulating voltage command value, and the capacitor voltage mean value to submodule individual controller 61 of the corresponding converter cell 1 through an optical communication channel. In the present disclosure, the arm voltage command value may be referred to as first voltage command value, and the circulating voltage command value may be referred to as second voltage command value.

[Hardware Configuration Example of Control Device]

Figure 5:
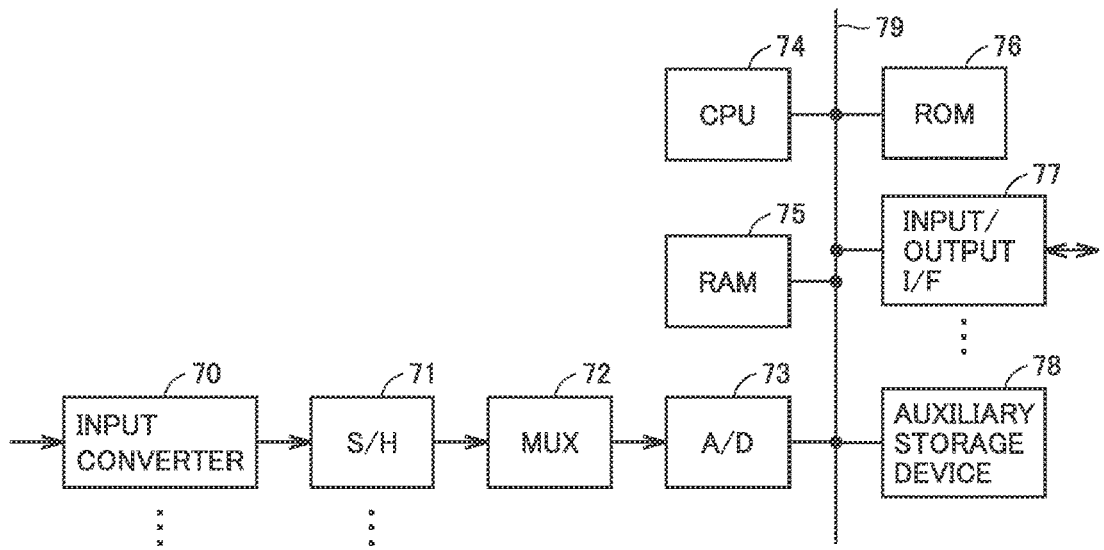
FIG. 5 is a block diagram showing an exemplary hardware configuration of control device 5 shown in FIG. 1 and FIG. 4.

FIG. 5 is a block diagram showing an exemplary hardware configuration of control device 5 shown in FIG. 1 and FIG. 4. Control device 5 in FIG. 5 is configured based on a computer. Specifically, referring to FIG. 5, control device 5 includes one or more input converters 70, one or more sample and hold (S/H) circuits 71, a multiplexer (MUX) 72, and an A/D converter 73. Control device 5 further includes one or more central processing units (CPU) 74, a random access memory (RAM) 75, and a read only memory (ROM) 76. Control device 5 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal at a voltage level suitable for subsequent signal processing.

Sample and hold circuit 71 is provided for each input converter 70. Sample and hold circuit 71 samples a signal representing the electrical quantity received from the corresponding input converter 70 at a predetermined sampling frequency and holds the signal.

Multiplexer 72 successively selects the signals held by a plurality of sample and hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 5 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detected values.

Input/output interface 77 is an interface circuit for communication between CPU 74 and an external device. One of input/output interfaces 77 is connected to communication device 52 shown in FIG. 10.

Unlike the example of FIG. 5, at least a part of control device 5 may be configured using circuitry such as a field programmable gate array (FPGA) and an application specific integrated circuit (ASIC). Individual controller 61 for each converter cell may also be configured based on a computer in the same manner as control device 5 and may be at least partially configured with circuitry such as an FPGA and an ASIC. Alternatively, at least a part of control device 5 and at least a part of submodule individual controller 61 may be configured with an analog circuit.

[Operation of All-Arm Common Controller]

Figure 6:
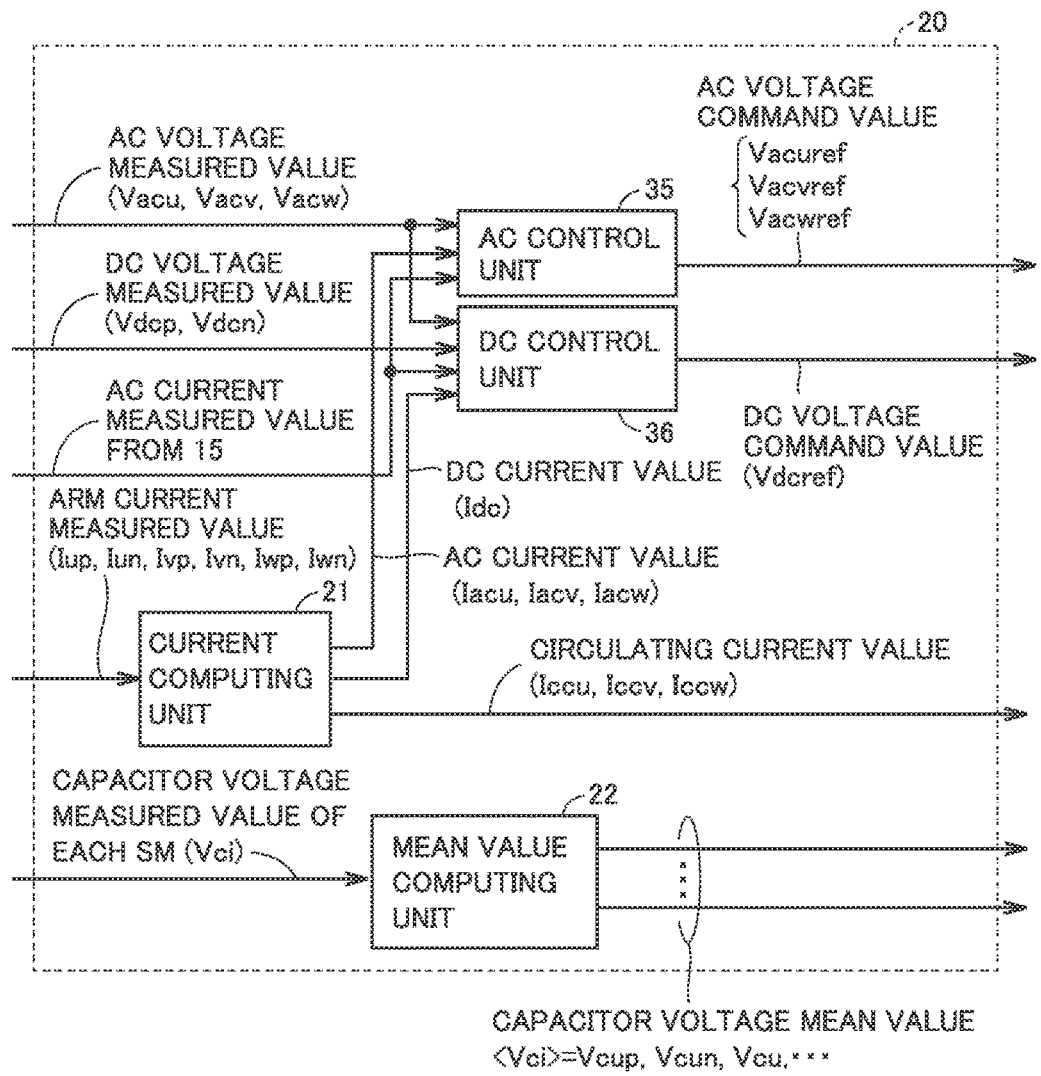
FIG. 6 is a block diagram showing the operation of an all-arm common controller in FIG. 4.

FIG. 6 is a block diagram showing the operation of the all-arm common controller in FIG. 4. Referring to FIG. 6, all-arm common controller 20 includes an AC control unit 35, a DC control unit 36, a current computing unit 21, and a mean value computing unit 22. The functions of these components are implemented by, for example, CPU 74 in FIG. 5.

AC control unit 35 generates AC voltage command values Vacuref, Vacvref, and Vacwref, based on AC voltage measured value Vacu, Vacv, Vacw of each phase, AC current measured value of each phase detected by AC current detector 15, and AC current value Iacu, Iacv, Iacw. The detailed operation of AC control unit 35 will be described later with reference to FIG. 8.

DC control unit 36 generates DC voltage command value Vdcref. The configuration of DC control unit 36 varies between when the power conversion device operates as a rectifier to supply power from the AC circuit to the DC circuit and when conversely the power conversion device operates as an inverter. When the power conversion device operates as a rectifier, DC control unit 36 generates DC voltage command value Vdcref, based on DC voltage measured values Vdcp and Vdcn. On the other hand, when the power conversion device operates as an inverter, DC control unit 36 generates DC voltage command value Vdcref, based on AC voltage measured value Vacu, Vacv, Vacw, AC current measured value of each phase detected by AC current detector 15, and DC current value Idc. The detailed operation of DC control unit 36 will be described later with reference to FIG. 9.

(Operation of Current Computing Unit)

Current computing unit 21 computes DC current value Idc, AC current values Iacu, Iacv, and Iacw, and circulating current values Iccu, Iccv, and Iccw, based on the arm current measured value. Specifically, the procedure is as follows.

First, referring to FIG. 1, the connection point of positive-side arm 13a and negative-side arm 14b in u-phase leg circuit 8a is u-phase AC terminal Nu. U-phase AC terminal Nu is connected to transformer 3. Current flowing from u-phase AC terminal Nu toward transformer 3 is u-phase AC current Iacu. Then, u-phase AC current Iacu is equal to a current value obtained by subtracting current value Ipn flowing through negative-side arm 14b that is measured by current detector 9b from current value Iup flowing through positive-side arm 13a that is measured by current detector 9a. That is, u-phase AC current Iacu is equal to $$Iacu=Iup-Iun \quad (1).$$

The mean value of u-phase positive-side arm current Iup and u-phase negative-side arm current Iun is common current Icomu flowing through both arms 13a and 14b. This common current Icomu is u-phase leg current flowing through the DC terminal of leg circuit 8a. That is, u-phase leg current Icomu can be computed as $$Icomu=(Iup+Iun)/2 \quad (2).$$

Similarly, for the v phase, using v-phase positive-side arm current Ivp and v-phase negative-side arm current Ivn, v-phase AC current Iacv and v-phase leg current Icomv can be calculated in accordance with $$Iacv=Ivp-Ivn \quad (3)$$

$$Icomv=(Ivp+Ivn)/2 \quad (4).$$

Similarly, for the w phase, using w-phase positive-side arm current Iwp and w-phase negative-side arm current Iwn, w-phase AC current Iacw and w-phase leg current Icomw can be calculated in accordance with $$Iacw=Iwp-Iwn \quad (5)$$

$$Icomw=(Iwp+Iwn)/2 \quad (6).$$

The DC terminal on the positive side of leg circuit 8a, 8b, 8c of each phase is connected in common as positive-side DC terminal Np, and the DC terminal on the negative side is connected in common as negative-side DC terminal Nn. Based on this configuration, the current value obtained by adding leg current Icomu, Icomv, Icomw of each phase is DC current Idc flowing from the positive-side terminal of DC circuit 4 and back to DC circuit 4 through the negative-side terminal. Therefore, DC current Idc can be computed as $$Idc=Icomu+Icomv+Icomw \quad (7).$$

The DC current component included in leg current can be shared equally among the phases so that the current capacity of cells can be made equal as appropriate. Considering this, the difference between the leg current and ⅓ of the DC current value can be computed as the current value of circulating current that does not flow to DC circuit 4 but flows between the legs of the phases. Specifically, u-phase, v-phase, and w-phase circulating currents Iccu, Iccv, Iccw can be computed as follows.

$$Iccu=Icomu-Idc/3 \quad (8)$$

$$Iccv=Icomv-Idc/3 \quad (9)$$

$$Iccw=Icomw-Idc/3 \quad (10)$$

(Operation of Mean Value Computing Unit)

Figure 7:
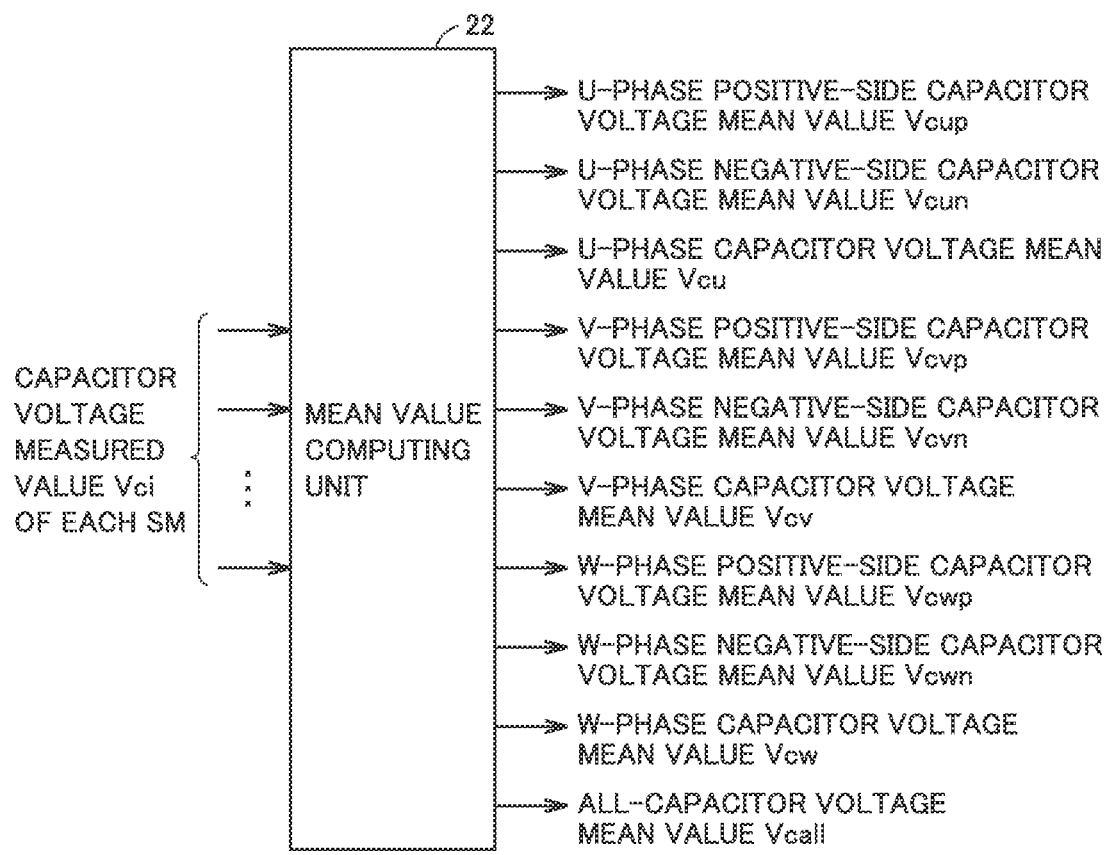
FIG. 7 is a diagram for explaining the operation of a mean value computing unit in the all-arm common controller in FIG. 6.

FIG. 7 is a diagram for explaining the operation of the mean value computing unit in the all-arm common controller in FIG. 6. Mean value computing unit 22 calculates mean value <Vci> for each of various units, from individual capacitor voltage measured values Vci detected in converter cells 1.

Specifically, mean value computing unit 22 calculates all-capacitor voltage mean value Vcall in the entire power conversion device.

Mean value computing unit 22 further calculates capacitor voltage mean value Vcup in u-phase positive-side arm 13a, capacitor voltage mean value Vcun in u-phase negative-side arm 14a, and capacitor voltage mean value Vcu in the entire u-leg circuit 8a.

Similarly, mean value computing unit 22 calculates capacitor voltage mean value Vcvp in v-phase positive-side arm 13b, capacitor voltage mean value Vcvn in v-phase negative-side arm 14b, and capacitor voltage mean value Vcv in the entire v-leg circuit 8b.

Similarly, mean value computing unit 22 calculates capacitor voltage mean value Vcwp in w-phase positive-side arm 13c, capacitor voltage mean value Vcwn in w-phase negative-side arm 14c, and capacitor voltage mean value Vcw in the entire w-leg circuit 8c. In the present description, mean value <Vci> is used as a generic term of various mean values described above.

(Detailed Operation of AC Control Unit)

Figure 8:
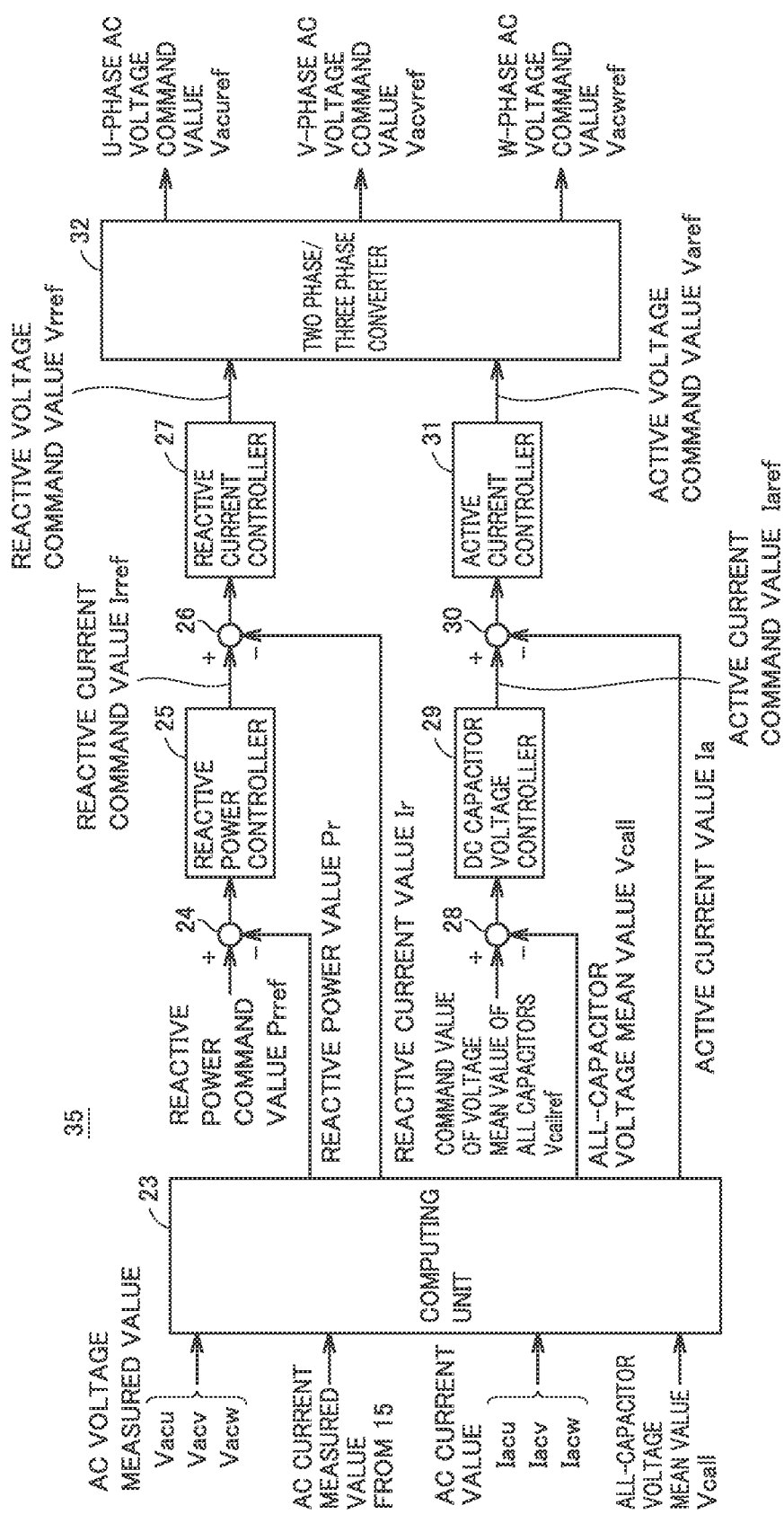
FIG. 8 is a diagram for explaining the operation of an AC control unit in the all-arm common controller in FIG. 6.

FIG. 8 is a diagram for explaining the operation of the AC control unit in the all-arm common controller in FIG. 6. Referring to FIG. 8, AC control unit 35 includes a computing unit 23, a reactive power controller 25, a reactive current controller 27, a DC capacitor voltage controller 29, and an active current controller 31. AC control unit 35 further includes subtracters 24, 26, 28, and 30 and a two phase/three phase converter 32.

Computing unit 23 receives AC voltage measured value Vacu, Vacv, Vacw of each phase, AC current measured value of each phase of AC circuit 2 detected by AC current detector 15, and AC current value Iacu, Iacv, Iacw calculated by current computing unit 21 in FIG. 6. Computing unit 23 calculates reactive power value Pr, based on AC voltage measured value Vacu, Vacv, Vacw of each phase and AC current measured value of each phase. Computing unit 23 further calculates active current value Ia and reactive current value Ir, based on AC voltage measured value Vacu, Vacv, Vacw of each phase and the calculated AC current value Iacu, Iacv, Iacw.

Subtracter 24 calculates a deviation between the applied reactive power command value Prref and reactive power value Pr calculated by computing unit 23.

Reactive power controller 25 performs computation on the deviation calculated by subtracter 24 to generate reactive current command value Irref. Reactive power controller 25 may be configured as a PI controller that performs proportional computation and integral computation on the deviation or may configured as a PID controller that additionally performs derivative computation. Alternatively, the configuration of another controller for use in feedback control may be used as reactive power controller 25.

In FIG. 8, the configuration of AC control unit 35 includes reactive power controller 25. Instead of reactive power controller 25, a system voltage controller may be provided that performs computation on a deviation between a system voltage command value and a system voltage measured value. As a result, feedback control is performed such that the system voltage measured value is equal to the system voltage command value.

Subtracter 26 calculates a deviation between reactive current command value Irref and reactive current value Ir calculated by computing unit 23.

Reactive current controller 27 performs computation on the deviation calculated by subtracter 26 to generate reactive voltage command value Vrref. Reactive current controller 27 may be configured as a PI controller that performs proportional computation and integral computation on the deviation or may configured as a PID controller that additionally performs derivative computation. Alternatively, the configuration of another controller for use in feedback control may be used as reactive current controller 27.

Subtracter 28 computes a deviation between command value Vcallref applied for the all-capacitor voltage mean value and all-capacitor voltage mean value Vcall. As explained with reference to FIG. 7, all-capacitor voltage mean value Vcall is obtained by averaging capacitor voltage measured values Vci of individual submodules over the entire power conversion device.

DC capacitor voltage controller 29 performs computation on the deviation calculated by subtracter 28 to generate active current command value Iaref. DC capacitor voltage controller 29 may be configured as a PI controller that performs proportional computation and integral computation on the deviation or may configured as a PID controller that additionally performs derivative computation. Alternatively, the configuration of another controller for use in feedback control may be used as DC capacitor voltage controller 29.

Subtracter 30 calculates a deviation between active current command value Iaref and active current value Ia calculated by computing unit 23.

Active current controller 31 performs computation on the deviation calculated by subtracter 30 to generate active voltage command value Varef. Active current controller 31 may be configured as a PI controller that performs proportional computation and integral computation on the deviation or may configured as a PID controller that additionally performs derivative computation. Alternatively, the configuration of another controller for use in feedback control may be used as active current controller 31.

Two phase/three phase converter 32 generates u-phase AC voltage command value Vacuref, v-phase AC voltage command value Vacvref, and w-phase AC voltage command value Vacwref by coordinate transformation from active voltage command value Varef and reactive voltage command value Vrref. The coordinate transformation by two phase/three phase converter 32 can be implemented by, for example, inverse Park transformation and inverse Clarke transformation. Alternatively, the coordinate transformation by two phase/three phase converter 32 can be implemented by inverse Park transformation and spatial vector transformation.

(Detailed Operation of DC Control Unit)

FIG. 9 is a diagram for explaining the operation of the DC control unit in the all-arm common controller in FIG. 6. FIG. 9(A) is a functional block diagram in a case where the power conversion device operates as a rectifier that supplies power from the AC circuit to the DC circuit. FIG. 9(B) is a functional block diagram in a case where the power conversion device operates as an inverter that supplies active power from the DC circuit to the AC circuit. The power conversion device provided at one end of a DC transmission line includes a DC control unit having the configuration in FIG. 9(A), and the power conversion device provided at the other end of the DC transmission line includes a DC control unit having the configuration in FIG. 9(B).

Referring to FIG. 9(A), DC control unit 36 for rectifier includes a subtracter 80 and a DC controller 81. Subtracter 80 calculates a deviation between the applied DC terminal voltage command value and DC terminal voltage measured value (Vdcp−Vdcn). The DC terminal voltage measured value is a transmission end voltage obtained from DC voltage measured values Vdcp and Vdcn detected by DC voltage detectors 11*a* and 11*b*. DC controller 81 performs predetermined computation on the deviation to generate DC voltage command value Vdcref. For example, DC controller 81 may be configured as a PI controller that performs proportional computation and integral computation on the deviation or may configured as a PID controller that additionally performs derivative computation. Alternatively, the configuration of another controller for use in feedback control may be used as DC controller 81.

Referring to FIG. 9(B), DC control unit 36 for inverter includes a computing unit 82, subtracters 83 and 85, an active power controller 84, and a DC current controller 86.

Computing unit 82 receives AC voltage measured value Vacu, Vacv, Vacw of each phase and AC current measured value of each phase of AC circuit 2 detected by AC current detector 15. Computing unit 82 calculates active power value Pa, based on these voltage values and current values. Subtracter 83 calculates a deviation between the applied active power command value Paref and the calculated active power value Pa.

Active power controller 84 performs computation on the deviation calculated by subtracter 83 to generate DC current command value Idcref. Active power controller 84 may be configured as a PI controller that performs proportional computation and integral computation on the deviation or may configured as a PID controller that additionally performs derivative computation. Alternatively, the configuration of another controller for use in feedback control may be used as active power controller 84.

Subtracter 85 computes a deviation between DC current command value Idcref and DC current value Idc. As explained with reference to FIG. 6, DC current value Idc is calculated by current computing unit 21 using arm current measured values Iup, Iun, Ivp, Ivn, Iwp, and Iwn.

DC current controller 86 performs computation on the deviation calculated by subtracter 85 to generate DC voltage command value Vdcref. DC current controller 86 may be configured as a PI controller that performs proportional computation and integral computation on the deviation or may configured as a PID controller that additionally performs derivative computation. Alternatively, the configuration of another controller for use in feedback control may be used as DC current controller 86.

[Function of Arm Individual Controller of Each Phase]

The operation of arm individual controller 40a, 40b, 40c of each phase in FIG. 4 will now be described. Hereinafter, the operation of u-phase arm individual controller 40a is described as a representative. The operation of v-phase arm individual controller 40b and w-phase arm individual controller 40c is the same as the operation described below, where the u phase should read as the v phase and the w phase.

Figure 10:
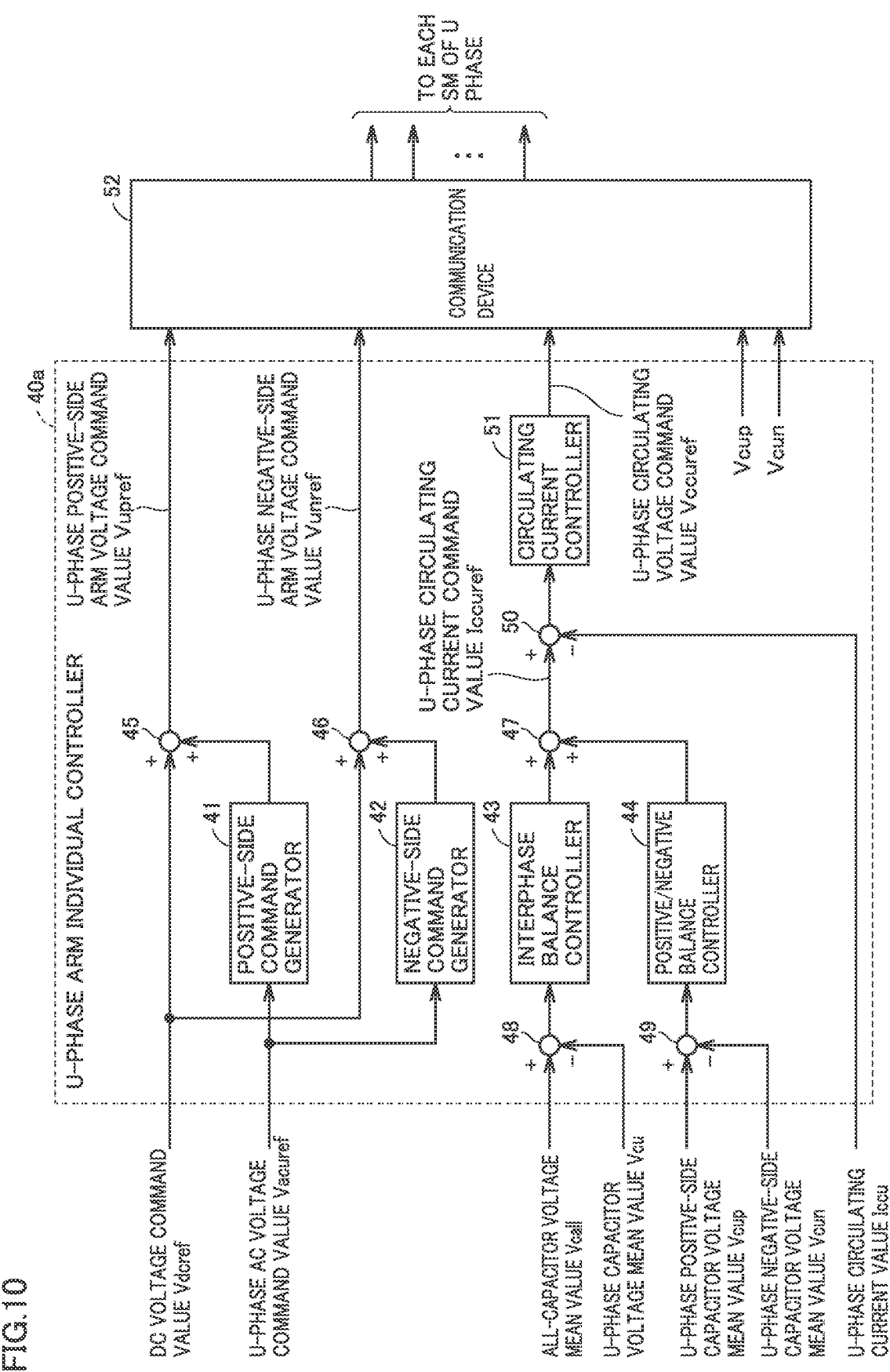
FIG. 10 is a block diagram showing the operation of a u-phase arm individual controller.

FIG. 10 is a block diagram showing the operation of the u-phase arm individual controller. Referring to FIG. 10, u-phase arm individual controller 40a includes a positive-side command generator 41, a negative-side command generator 42, an interphase balance controller 43, a positive/negative balance controller 44, and a circulating current controller 51. U-phase arm individual controller 40a further includes adders 45, 46, and 47 and subtracters 48, 49, and 50.

Adder 45 adds DC voltage command value Vdcref to a value obtained by multiplying u-phase AC voltage command value Vacuref by −1 by positive-side command generator 41. U-phase positive-side arm voltage command value Vupref is thus generated.

Adder 46 adds DC voltage command value Vdcref to a value obtained by multiplying u-phase AC voltage command value Vacuref by +1 by negative-side command generator 42. U-phase negative-side arm voltage command value Vunref is thus generated.

Subtracter 48 calculates a difference between all-capacitor voltage mean value Vcall and u-phase capacitor voltage mean value Vcu. This deviation means variations in capacitor voltage between different phases.

Interphase balance controller 43 performs computation on the deviation calculated by subtracter 48. Specifically, interphase balance controller 43 may be configured as a PI controller that performs proportional computation and integral computation on the deviation or may configured as a PID controller that additionally performs derivative computation. Alternatively, the configuration of another controller for use in feedback control may be used as interphase balance controller 43.

Subtracter 49 calculates a deviation between u-phase positive-side capacitor voltage mean value Vcup and u-phase negative-side capacitor voltage mean value Vcun. This deviation means variations in capacitor voltage between u-phase positive-side arm 13a and u-phase negative-side arm 14a.

Positive/negative balance controller 44 performs computation on the deviation calculated by subtracter 49. Specifically, positive/negative balance controller 44 may be configured as a PI controller that performs proportional computation and integral computation on the deviation or may configured as a PID controller that additionally performs derivative computation. Alternatively, the configuration of another controller for use in feedback control may be used as positive/negative balance controller 44.

Adder 47 adds the computation result by interphase balance controller 43 to the computation result by positive/negative balance controller 44 to generate u-phase circulating current command value Iccuref.

Subtracter 50 calculates a deviation between u-phase circulating current command value Iccuref and u-phase circulating current Iccu. Circulating current controller 51 performs computation on the deviation calculated by subtracter 50 to generate u-phase circulating voltage command value Vccuref. Circulating current controller 51 may be configured as a PI controller that performs proportional computation and integral computation on the deviation or may configured as a PID controller that additionally performs derivative computation. Alternatively, the configuration of another controller for use in feedback control may be used as circulating current controller 51.

Communication device 52 transmits u-phase positive-side arm voltage command value Vupref, u-phase circulating voltage command value Vccuref, and u-phase positive-side capacitor mean value Vcup to individual controller 61 of each converter cell 1 included in u-phase positive-side arm 13a. Communication device 52 further transmits u-phase negative-side arm voltage command value Vunref, u-phase circulating voltage command value Vccuref, and u-phase negative-side capacitor mean value Vcun to individual controller 61 of each converter cell 1 included in u-phase negative-side arm 14a.

In the description above, the calculation of u-phase positive-side arm voltage command value Vupref and u-phase negative-side arm voltage command value Vunref and the calculation of u-phase circulating voltage command value Vccuref are independent of each other. Therefore, the calculation cycle of u-phase circulating voltage command value Vccuref can be made shorter than the calculation cycle of u-phase positive-side arm voltage command value Vupref and u-phase negative-side arm voltage command value Vunref. As a result, the controllability of circulating current that changes faster than AC current of AC circuit 2 and DC current of DC circuit 4 can be improved.

[Operation of Submodule Individual Controller]

The operation of submodule individual controller 61 provided in each converter cell will now be described. Hereinafter, the operation of submodule individual controller 61 for u-phase positive-side arm 13a will be described as a representative. The operation of submodule individual controller 61 for u-phase negative-side arm 14a is the same as the one described below, where the positive-side should read as the negative-side. The operation of submodule individual controllers 61 for the v phase and the w phase is the same as the one described below, where the u phase should read as the v phase or the w phase.

Figure 11:
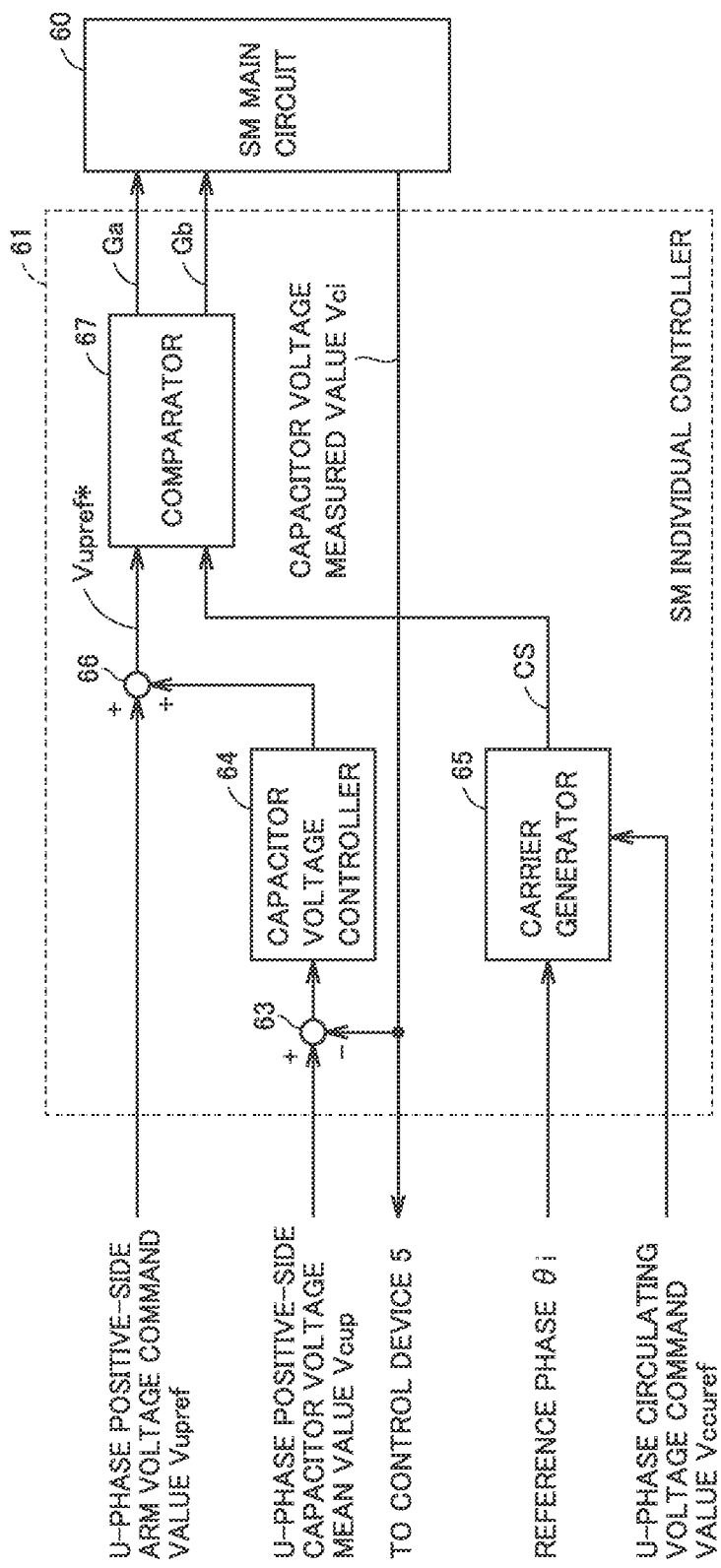
FIG. 11 is a block diagram showing the operation of a submodule individual controller for a u-phase positive-side arm.

FIG. 11 is a block diagram showing the operation of the submodule individual controller for the u-phase positive-side arm. In FIG. 11, the A/D converter for converting capacitor voltage measured value Vci into a digital value is not shown. In FIG. 11, communication device 62 that performs communication between submodule individual controller 61 and control device 5 is also not shown.

Referring to FIG. 11, submodule individual controller 61 includes a capacitor voltage controller 64, a carrier generator 65, a comparator 67, a subtracter 63, and an adder 66.

Subtracter 63 calculates a deviation between u-phase positive-side capacitor voltage mean value Vcup as a capacitor voltage command value and capacitor voltage measured value Vci. As explained with reference to FIG. 10, u-phase positive-side capacitor voltage mean value Vcup is received from the corresponding u-phase arm individual controller 40a. Capacitor voltage measured value Vci is detected in the corresponding submodule main circuit 60.

Capacitor voltage controller 64 performs computation on the deviation calculated by subtracter 63. Specifically, capacitor voltage controller 64 may be configured as a PI controller that performs proportional computation and integral computation on the deviation or may configured as a PID controller that additionally performs derivative computation. Alternatively, the configuration of another controller for use in feedback control may be used as capacitor voltage controller 64.

Adder 66 adds u-phase positive-side arm voltage command value Vupref to the output of capacitor voltage controller 64 to generate a final u-phase positive-side arm voltage command value Vupref*.

Carrier generator 65 generates a carrier signal CS for use in phase shift pulse width modulation (PWM) control. The phase shift PWM control allows the timings of PWM signals output to a plurality of converter cells 1 in u-phase positive-side arm 13a to be shifted from each other. This can reduce harmonic components included in a synthesized voltage of output voltages of converter cells 1. For example, submodule individual controllers 61 provided in converter cells 1 generate carrier signals CS shifted in phase from each other, based on a common reference phase θi received from control device 5.

Carrier generator 65 further modulates the generated carrier signal CS in accordance with u-phase circulating voltage command value Vccuref. Carrier generator 65 then outputs the modulated carrier signal to comparator 67 on the subsequent stage. The pulse width of PWM signal (that is, gate control signals Ga and Gb) generated in comparator 67 on the subsequent stage changes in accordance with u-phase circulating voltage command value Vccuref. As a result, the deviation between u-phase circulating current command value Iccuref and u-phase circulating current Iccu are controlled to be smaller. A specific example of the modulation method of carrier signal CS in carrier generator 65 will be described later with reference to FIG. 12 and FIG. 13.

Comparator 67 compares u-phase positive-side arm voltage command value Vupref* with carrier signal CS modulated based on u-phase circulating voltage command value Vccuref. In accordance with the comparison result, comparator 67 generates gate control signals Ga and Gb as PWM modulation signals for controlling switching elements 1a and 1b included in submodule main circuit 60. Gate control signals Ga and Gb are respectively supplied to the control electrodes of switching elements 1a and 1b in FIG. 2. As a result, the output voltage of submodule main circuit 60 is controlled in accordance with u-phase circulating current Iccu.

[Specific Example of Modulation Method of Carrier Signal CS]

Hereinafter, base line modulation and frequency modulation will be described as specific examples of the modulation method of carrier signal CS. The modulation method of carrier signal CS is not limited to the methods described below. Any modulation method may be employed as long as it can perform control such that the pulse width of the finally generated gate control signal changes in accordance with the circulating voltage command value (for example, the greater the circulating current command value is, the wider the pulse width of the gate control signal is).

(Base Line Modulation)

FIG. 12 is a diagram for explaining a first modulation method of the carrier signal. In the example in FIG. 12, a base line BL that is a reference potential of carrier signal CS changes in accordance with circulating voltage command values Vccuref, Vccvref, and Vccwref.

FIG. 12(A) shows the waveforms of carrier signal CS, u-phase positive-side arm voltage command value Vupref*, and the generated gate control signal Ga in a case where base line modulation is not performed. FIG. 12(B) shows the waveforms of carrier signal CS, u-phase positive-side arm voltage command value Vupref*, and the generated gate control signal Ga in a case where base line modulation is performed. The waveform of u-phase positive-side arm voltage command value Vupref* is the same in the case in FIG. 12(A) and the case in FIG. 12(B). A triangular wave is used as carrier signal CS. The characteristics of carrier signal CS are common in the case in FIG. 12(A) and the case in FIG. 12(B) except for base line BL. The signal waveforms shown in FIG. 12(A) and FIG. 12(B) are exaggerated for explanation and do not illustrate actual signal waveforms as they are.

Referring to FIG. 12(A), when u-phase positive-side arm voltage command value Vupref* is greater than carrier signal CS, gate control signal Ga exhibits high level (H level). In this case, gate control signal Gb exhibits low level (L level). In the example of submodule main circuit 60H in FIG. 2, switching element 1a is controlled to be turned on, and switching element 1b is controlled to be turned off. As a result, voltage between both ends of DC capacitor 1e is applied between input/output terminals 1p and 1n.

On the other hand, when u-phase positive-side arm voltage command value Vupref* is smaller than carrier signal CS, gate control signal Ga exhibits L level. In this case, gate control signal Gb exhibits H level. In the example of submodule main circuit 60H in FIG. 2, switching element 1a is turned off, and switching element 1b is turned on. As a result, a potential difference between input/output terminals 1p and 1n is 0 V.

Referring to FIG. 12(B), when base line BL changes in accordance with u-phase circulating voltage command value Vccuref, the pulse width of gate control signal Ga changes in accordance with the change of base line BL. Specifically, in the example in FIG. 12(B), when base line BL is a lower potential compared with the case in FIG. 12(A), the pulse width of gate control signal Ga becomes greater. When base line BL is a higher potential compared with the case in FIG. 12(A), the pulse width of gate control signal Ga becomes smaller. In this way, base line BL is changed in accordance with the circulating voltage command value, whereby the pulse width of gate control signal Ga can be changed. Comparator 67 changes gate control signal Gb such that it is complementary to gate control signal Ga.

(Frequency Modulation)

Figure 13:
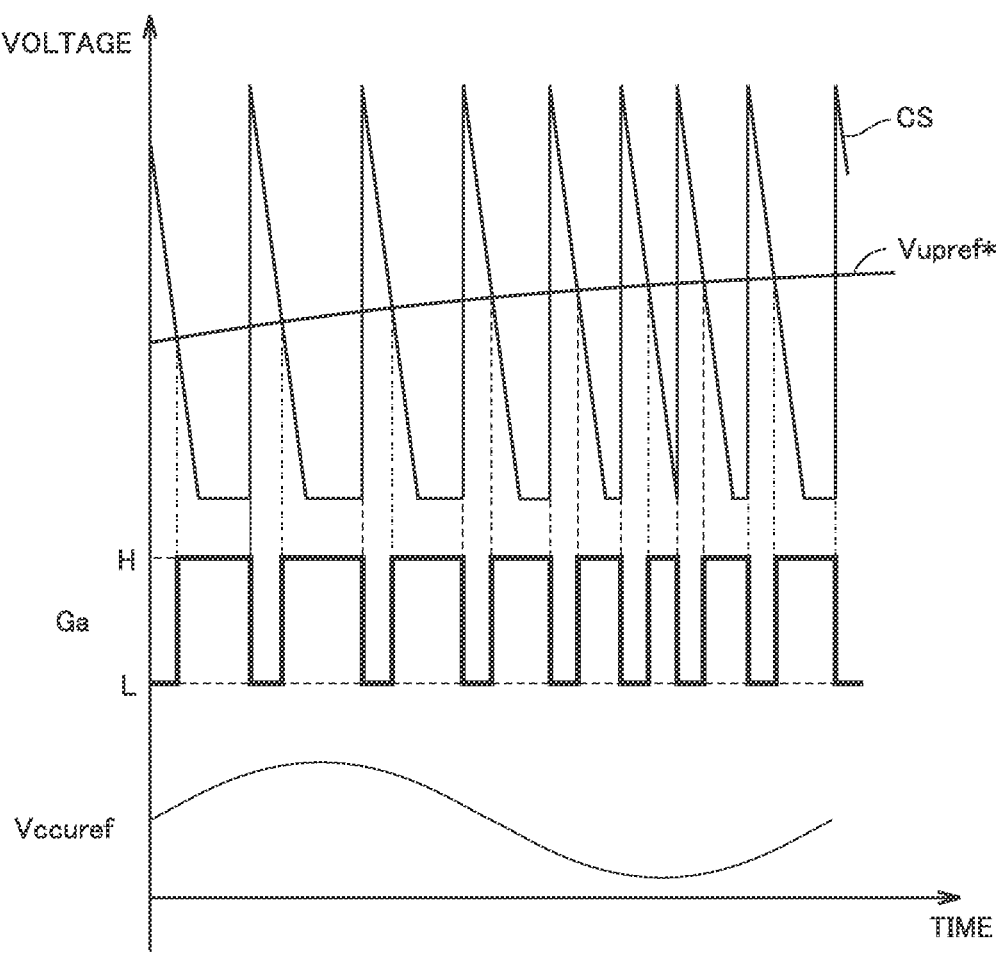
FIG. 13 is a diagram for explaining a second modulation method of a carrier signal.

FIG. 13 is a diagram for explaining a second modulation method of the carrier signal. In the example in FIG. 13, the frequency of carrier signal CS changes in accordance with circulating voltage command values Vccuref, Vccvref, and Vccwref.

FIG. 13 shows the waveforms of carrier signal CS, u-phase positive-side arm voltage command value Vupref*, the generated gate control signal Ga, and u-phase circulating voltage command value Vccuref. A sawtooth pulse waveform is used as carrier signal CS. The waveform of each single pulse included in carrier signal CS is the same but the frequency it is generated (that is, the frequency of carrier signal CS) changes in accordance with u-phase circulating voltage command value Vccuref.

Specifically, in the example in FIG. 13, the smaller u-phase circulating voltage command value Vccuref is, the higher the frequency of carrier signal CS is, and as a result, the pulse width of gate control signal Ga is smaller. Conversely, the greater u-phase circulating voltage command value Vccuref is, the lower the frequency of carrier signal CS is, and as a result, the pulse width of gate control signal Ga is larger. In this way, the frequency of carrier signal CS is changed in accordance with the circulating voltage command value, whereby the pulse width of gate control signal Ga can be changed.

[Effect of First Embodiment]

The configuration of the power conversion device as described above enables circulating current control faster and more accurate than the conventional one. The advantages will be specifically described in comparison with the conventional technique.

One of the problems in circulating current control is in that the magnitude of circulating current is considerably smaller than the magnitude of arm current. As a result, the magnitude of a circulating voltage command value is significantly smaller than the magnitude of an arm voltage command value. In the conventional technique, a voltage command value to be supplied to each submodule is generated by adding a circulating voltage command value to an arm voltage command value. However, since the dynamic range in communication between control device 5 and submodule individual controller 61 has limitations, the quantization bit rate of the relatively small circulating voltage command value is small although the quantization bit rate of the relatively large arm voltage command value is sufficient. As a result, the accuracy in circulating current control is low.

In the power conversion device according to the present embodiment, an arm voltage command value and a circulating voltage command value are transmitted separately from control device 5 to submodule individual controller 61. Therefore, the bit width can be set to be small in accordance with the magnitude of the circulating voltage command value, independently of the arm voltage command value, so that the quantization bit rate corresponding to the circulating voltage command value can be increased. The accuracy in circulating current control is thus improved.

Another problem in circulating current control is in that circulating current changes abruptly, compared with change of AC current and DC current. In the conventional technique, the calculation cycle of the arm voltage command value is set to be relatively long, in consideration of the computation time of the CPU. The circulating current control is also performed with this calculation cycle. As a result, the response to abrupt change of circulating current is slow. To solve this, simply setting a shorter calculation cycle of the circulating voltage command value is not enough. This is because a final voltage command value is calculated by simply adding the circulating voltage command value and the arm voltage command value and, therefore, the circulating voltage command value and the arm voltage command value may interfere with each other.

In the power conversion device according to the present embodiment, the circulating voltage command value is used for modulation of the carrier signal for PWM signal generation, independently of the arm voltage command value. Therefore, the calculation cycle of the circulating voltage command value can be set to be shorter than the calculation cycle of the arm voltage command value in order to improve the controllability of circulating current that changes faster than AC current of AC circuit 2 and DC current of DC circuit 4.

As described above, the power conversion device according to the present embodiment can achieve circulating current control faster and more accurate than the conventional one.

Second Embodiment

A power conversion device in a second embodiment differs from the first embodiment in configuration of the submodule individual controller. The other configuration of the power conversion device is the same as or similar to that of the first embodiment and will not be further elaborated.

Figure 14:
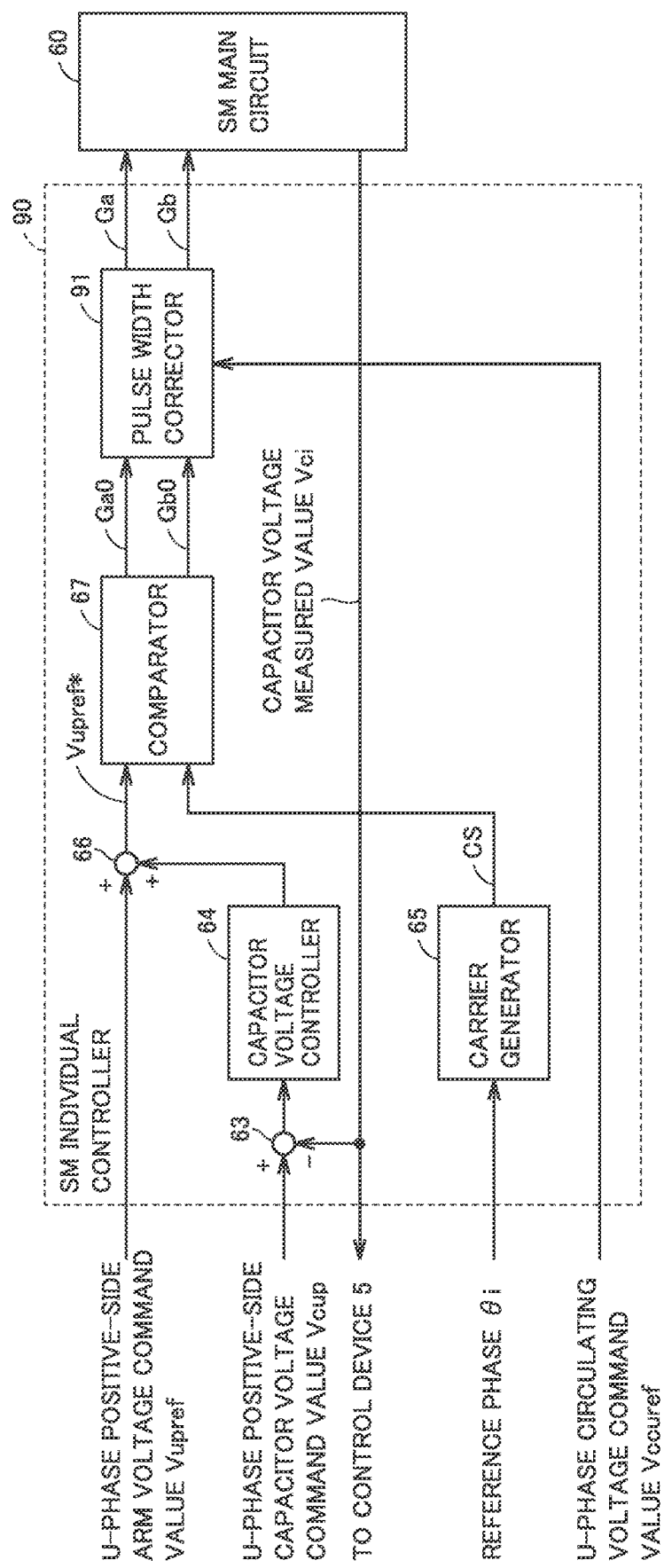
FIG. 14 is a block diagram showing a configuration of submodule individual controller 90 in a power conversion device in a second embodiment.

FIG. 14 is a block diagram showing a configuration of submodule individual controller 90 in the power conversion device in the second embodiment. Submodule individual controller 90 in FIG. 14 differs from submodule individual controller 61 in FIG. 11 in that it further includes a pulse width corrector 91.

Specifically, submodule individual controller 90 includes capacitor voltage controller 64, carrier generator 65, comparator 67, subtracter 63, and adder 66. The operation of subtracter 63, capacitor voltage controller 64, and adder 66 is similar to that of the case in FIG. 11 and will not be further elaborated.

Carrier generator 65 generates a carrier signal CS for use in phase shift pulse width modulation (PWM) control. The phase shift PWM control allows the timings of PWM signals output to a plurality of converter cells 1 in u-phase positive-side arm 13a to be shifted from each other. Unlike the case in FIG. 11, in the case of FIG. 14, modulation of carrier signal CS based on u-phase circulating voltage command value Vccuref is not performed.

Comparator 67 compares u-phase positive-side arm voltage command value Vupref* with carrier signal CS to generate PWM modulation signals Ga0 and Gb0. PWM modulation signals Ga0 and Gb0 are signals from which gate control signals Ga and Gb are generated, respectively.

Pulse width corrector 91 corrects the pulse widths of PWM modulation signals Ga0 and Gb0 in accordance with u-phase circulating voltage command value Vccuref to generate gate control signals Ga and Gb, respectively. For example, pulse width corrector 91 changes the falling timing of the corresponding PWM modulation signal Ga0 in accordance with u-phase circulating voltage command value Vccuref such that the pulse width of gate control signal Ga increases as u-phase circulating voltage command value Vccuref increases. Since gate control signals Ga and Gb are signals complementary to each other, it is necessary to change the rising timing of PWM modulation signal Gb0 in accordance with the amount of change in falling timing of PWM modulation signal Ga0.

Gate control signals Ga and Gb generated by pulse width corrector 91 are respectively supplied to the control electrodes of switching elements 1a and 1b in FIG. 2. As a result, the output voltage of submodule main circuit 60 is controlled in accordance with u-phase circulating current Iccu.

The power conversion device including submodule individual controller 90 configured as described above also achieves an effect similar to that of the first embodiment. Specifically, the power conversion device according to the second embodiment can achieve circulating current control faster and more accurate than the conventional one.

Third Embodiment

Figure 15:
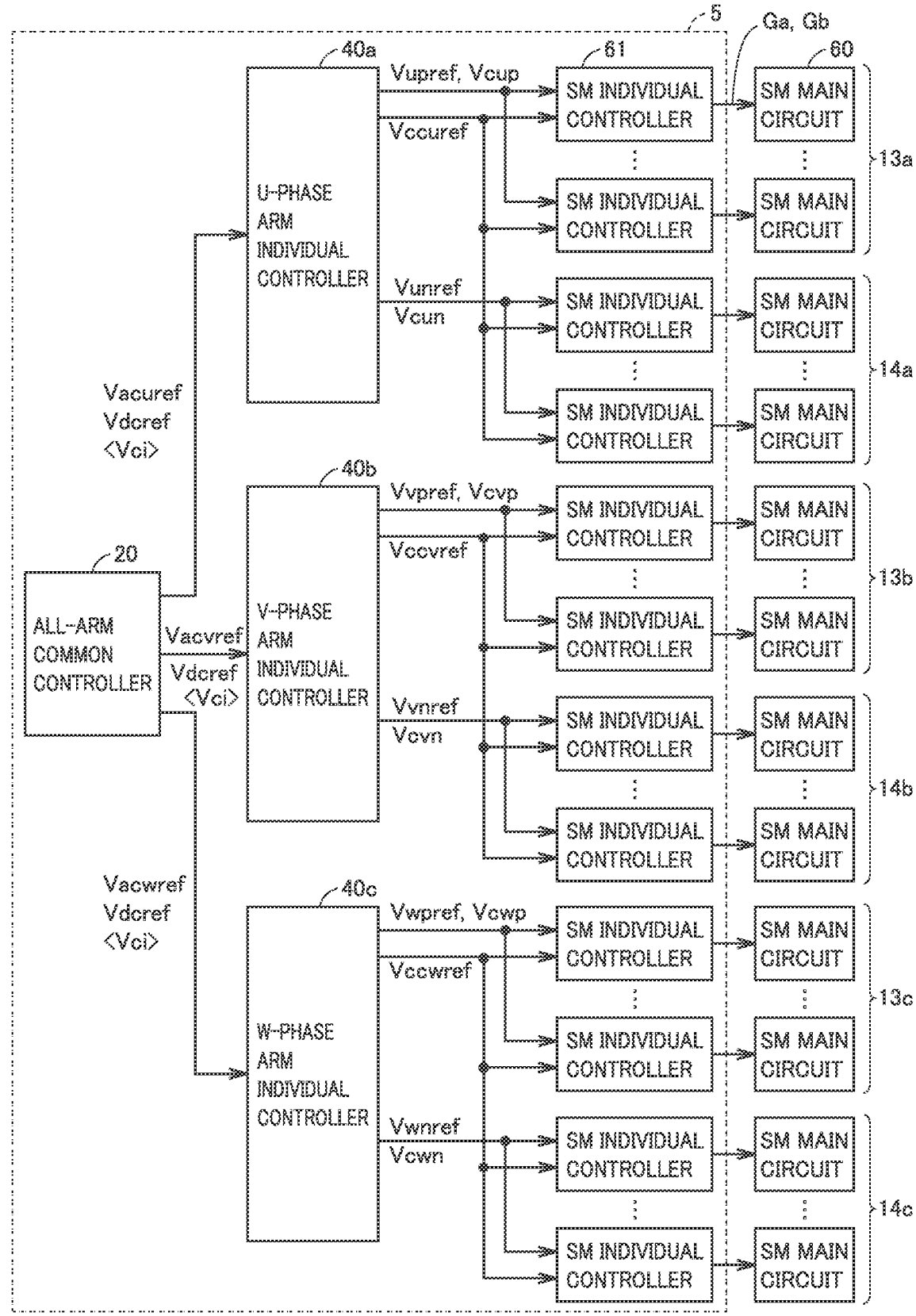
FIG. 15 is a block diagram showing an overall configuration of a control device in a power conversion device in a third embodiment.

FIG. 15 is a block diagram showing an overall configuration of the control device in a power conversion device in a third embodiment. FIG. 15 also shows submodule main circuit 60 provided in each converter cell 1.

As shown in FIG. 15, the power conversion device in the third embodiment differs from the first embodiment in arrangement of submodule individual controller 61. Specifically, submodule individual controller 61 is arranged inside control device 5. Therefore, an optical communication channel for transmitting gate control signals Ga and Gb is provided between submodule individual controller 61 and submodule main circuit 60. In FIG. 15, an optical communication device on the submodule individual controller 61 side and an optical communication device on the submodule main circuit 60 side are not shown.

The power conversion device including control device 5 having the configuration shown in FIG. 15 also achieves an effect similar to that of the first embodiment. Specifically, the power conversion device according to the third embodiment can achieve circulating current control faster and more accurate than the conventional one. The second embodiment and the third embodiment may be combined.

Fourth Embodiment

In a fourth embodiment, an example in which the power conversion device described in the first to third embodiments is applied to a static var compensator called static synchronous compensator (STATCOM) will be described.

Figure 16:
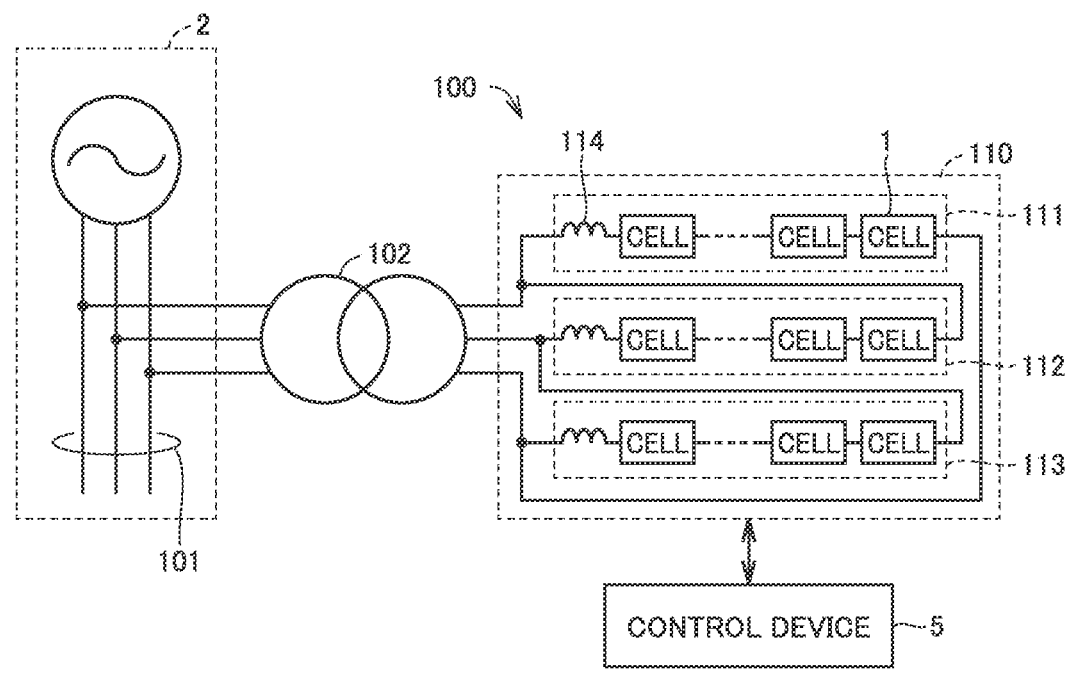
FIG. 16 is a diagram showing a configuration example of a delta-connected STATCOM.

FIG. 16 is a diagram showing a configuration example of a delta-connected STATCOM. Referring to FIG. 16, STATCOM 100 includes a power conversion circuit 110 and a control circuit 5 to control power conversion circuit 110. Power conversion circuit 110 includes leg circuits 111, 112, and 113 each including a plurality of converter cells 1 cascaded to each other. Leg circuits 111, 112, and 113 are delta-connected to each other. Each leg circuit 111, 112, 113 may be provided with a reactor 114 in series with a plurality of converter cells 1. STATCOM 110 is connected to a power transmission line 101 provided for AC circuit 2 (AC power system) through a transformer 102.

The converter cells 1 included in leg circuits 111, 112, and 113 may have any configuration illustrated in FIG. 2 and FIG. 3.

STATCOM 100 shown in FIG. 16 may include a configuration similar to control device 5 and individual controller 61 provided in each cell converter 1 described in the first to third embodiments. Therefore, an effect to similar to that of the first to third embodiments can be achieved.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 converter cell, 1a, 1b, 1f, 1g switching element, 1e DC capacitor, 1n, 1p input/output terminal, 2 AC circuit, 3 interconnecting transformer, 4 DC circuit, 5 control device, 7a, 7b reactor, 8a, 8b, 8c leg circuit, 9a, 9b arm current detector, 10 AC voltage detector, 11a, 11b DC voltage detector, 13a, 13b, 13c positive-side arm, 14a, 14b, 14c negative-side arm, 15 AC current detector, 20 all-arm common controller, 35 AC control unit, 36 DC control unit, 40a, 40b, 40c arm individual controller, 52, 62 communication device, 60, 60F, 60H, 60Hyb submodule main circuit, 61, 90 submodule individual controller, 64 capacitor voltage controller, 65 carrier generator, 67 comparator, 91 pulse width corrector, CS carrier signal, Ga, Gb gate control signal, Ga0, Gb0 PWM modulation signal, Iccu, Iccv, Iccw circulating current value, Idc DC current value, Iun, Ivn, Iwn negative-side arm current value, Iup, Ivp, Iwp positive-side arm current value, Vccuref, Vccvref, Vccwref circulating voltage command value, Vunref, Vvnref, Vwnref negative-side arm voltage command value, Vupref, Vvpref, Vwpref positive-side arm voltage command value.

The invention claimed is:

1. A power conversion device comprising:
a plurality of leg circuits, each of the leg circuits including a plurality of converter cells cascaded to each other, each of the converter cells including an energy storage and a switching element;
a control device to generate, for each of the leg circuits, a first voltage command value not based on circulating current circulating between the leg circuits and a second voltage command value based on the circulating current; and
a plurality of individual controllers provided respectively corresponding to the converter cells, the individual controllers each generating a gate control signal to control turning on and off of the switching element of the corresponding converter cell, based on the first voltage command value and the second voltage command value,
each of the individual controllers including:
a comparator to generate the gate control signal using pulse width modulation by comparison between the first voltage command value and a carrier signal; and
a carrier generator to generate the carrier signal modulated by the second voltage command value such that a pulse width of the gate control signal changes in accordance with the second voltage command value.

2. The power conversion device according to claim 1, wherein the carrier generator modulates the carrier signal by changing a reference potential of the carrier signal to be generated, in accordance with the second voltage command value.

3. The power conversion device according to claim 1, wherein the carrier generator modulates the carrier signal by changing a frequency of the carrier signal to be generated, in accordance with the second voltage command value.

4. A power conversion device comprising:
a plurality of leg circuits, each of the leg circuits including a plurality of converter cells cascaded to each other, each of the converter cells including an energy storage and a switching element;
a control device to generate, for each of the leg circuits, a first voltage command value not based on circulating current circulating between the leg circuits and a second voltage command value based on the circulating current; and
a plurality of individual controllers provided respectively corresponding to the converter cells, the individual controllers each generating a gate control signal to control turning on and off of the switching element of the corresponding converter cell, based on the first voltage command value and the second voltage command value,
each of the individual controllers including:
a comparator to generate a pulse width modulation signal by comparison between the first voltage command value and a carrier signal;
a carrier generator to generate the carrier signal; and
a pulse width corrector to generate the gate control signal by correcting the pulse width modulation signal in accordance with the second voltage command value.

5. The power conversion device according to claim 1, wherein
the power conversion device performs power conversion between a DC circuit and an AC circuit, and
the control device generates the first voltage command value, based on DC voltage and DC current of the DC circuit and AC voltage and AC current of the AC circuit.

6. The power conversion device according to claim 1, wherein the control device transmits the first voltage command value and the second voltage command value to each of the individual controllers through an optical communication channel.

7. The power conversion device according to claim 1, wherein each of the individual controllers transmits the gate control signal to the switching element of the corresponding converter cell through an optical communication channel.

8. The power conversion device according to claim 1, wherein a calculation cycle of the second voltage command value is shorter than a calculation cycle of the first voltage command value.

9. The power conversion device according to claim 4, wherein
the power conversion device performs power conversion between a DC circuit and an AC circuit, and
the control device generates the first voltage command value, based on DC voltage and DC current of the DC circuit and AC voltage and AC current of the AC circuit.

10. The power conversion device according to claim 4, wherein the control device transmits the first voltage command value and the second voltage command value to each of the individual controllers through an optical communication channel.

11. The power conversion device according to claim 4, wherein each of the individual controllers transmits the gate control signal to the switching element of the corresponding converter cell through an optical communication channel.

12. The power conversion device according to claim 4, wherein a calculation cycle of the second voltage command value is shorter than a calculation cycle of the first voltage command value.

* * * * *